(12) United States Patent
Iguchi et al.

(10) Patent No.: US 7,813,246 B2
(45) Date of Patent: Oct. 12, 2010

(54) METHOD AND APPARATUS FOR RECORDING BCA TO OPTICAL DISC USING MULTIPLE TURNTABLES

(75) Inventors: Shinji Iguchi, Shizuoka (JP); Takafumi Ishikawa, Shizuoka (JP); Yukihiro Takahata, Shizuoka (JP); Jun Sato, Tokyo (JP)

(73) Assignees: Pulstec Industrial Col., Ltd., Shizuoka (JP); Sony Disc & Digital Solutions Inc., Tokyo (JP)

( * ) Notice: Subject to any disclaimer, the term of this patent is extended or adjusted under 35 U.S.C. 154(b) by 182 days.

(21) Appl. No.: 12/174,409

(22) Filed: Jul. 16, 2008

(65) Prior Publication Data

US 2009/0025021 A1    Jan. 22, 2009

(30) Foreign Application Priority Data

Jul. 17, 2007    (JP) .............................. 2007-185513

(51) Int. Cl.
*G11B 11/00* (2006.01)

(52) U.S. Cl. ................. 369/53.37; 369/53.31; 369/53.2

(58) Field of Classification Search ................. 720/674, 720/615, 673, 672, 675, 695, 696, 699, 700; 369/53.2, 53.41, 53.37, 53.31, 30.85, 30.77
See application file for complete search history.

(56) References Cited

U.S. PATENT DOCUMENTS

| | | | | |
|---|---|---|---|---|
| 5,768,240 A * | 6/1998 | Hiraga | ......................... | 720/656 |
| 5,818,812 A * | 10/1998 | Moribe et al. | ............ | 369/47.15 |
| 6,052,465 A * | 4/2000 | Gotoh et al. | ............. | 369/53.21 |
| 6,295,262 B1 * | 9/2001 | Kusumoto et al. | ........ | 369/53.37 |
| 6,545,967 B2 * | 4/2003 | Kubokawa | .................. | 720/615 |
| 6,707,781 B2 * | 3/2004 | Yanagisawa et al. | ........ | 720/615 |
| 7,239,601 B2 * | 7/2007 | Sato et al. | ................ | 369/275.3 |
| 7,433,285 B2 * | 10/2008 | Shim | ....................... | 369/53.22 |
| 2002/0097656 A1 * | 7/2002 | Kubokawa | ................. | 369/75.2 |

FOREIGN PATENT DOCUMENTS

JP    10-289486    10/1998
JP    2007-35087   2/2007

* cited by examiner

*Primary Examiner*—Tan X Dinh
(74) *Attorney, Agent, or Firm*—K&L Gates LLP

(57) ABSTRACT

The BCA recording and reproducing apparatus performs recording of data onto an optical disc placed on a recording turntable, reproduction of data recorded on an optical disc placed on a reproducing turntable and ejection of an optical disc placed on an exchanging table and placement of a new optical disc on the exchanging table in parallel. A processing time is thereby shortened compared with the case of performing data recording, reproduction and exchange in series.

17 Claims, 20 Drawing Sheets

METHOD AND APPARATUS FOR RECORDING BCA TO OPTICAL DISC USING MULTIPLE TURNTABLES

CROSS REFERENCES TO RELATED APPLICATIONS

The present application claims priority to Japanese Patent Application JP 2007-185513 filed in the Japan Patent Office on Jul. 17, 2007, the entire contents of which being incorporated herein by reference.

BACKGROUND

The present application relates to an optical disc recording and reproducing apparatus and an optical disc recording and reproducing method which record data onto an optical disc and reproduce recorded data and, particularly, to an optical disc recording and reproducing apparatus and an optical disc recording and reproducing method which record identification data such as a barcode onto an optical disc and reproduce recorded identification data, for example.

A technique of recording barcode form data onto a burst cutting area (BCA) in the innermost periphery of an optical disc DK has been used for the purpose of illegal copy protection for optical discs. Identification information such as a serial number or an identification number (ID) is recorded in the barcode form data, and the use of such information in the management of optical discs prevents illegal copy of the optical discs.

The barcode form data (which is hereinafter referred to as a BCA code) is data that is composed of differently spaced bars. The data is obtained by converting (encoding) the original data of a BCA code (hereinafter referred to as BCA data), which is identification information such as a serial number or an identification number, by a prescribed data conversion scheme.

A BCA code is recorded as follows. Firstly, BCA data is converted (encoded) into a signal with different pulse intervals by a prescribed data conversion scheme. The signal is then converted into a signal which is synchronized with the rotation speed of an optical disc, and a pulse laser beam which is generated based on the converted signal and modulated between a high level and a low level is irradiated onto the BCA of the optical disc. In this case, the laser beam generally forms an oval-shaped optical spot on the BCA of the optical disc. The optical spot is moved to the rotative direction and the radial direction by a rotational mechanism of the optical disc and a feeding mechanism of the optical head or the optical disc, so that the laser beam is irradiated onto the substantially entire area of the BCA. The portion where the high-level laser beam is irradiated is subject to change such as melting of the surface of the optical disc or alteration of a recording layer. The changed portion serves as a bar of a BCA code. Therefore, the irradiation of the pulse laser beam modulated between a high level and a low level onto the BCA forms a portion where a surface is changed and a portion where a surface is not changed, and a BCA code which is composed of a plurality of differently spaced bars is formed (recorded) by a difference between the two portions.

If the reproducing laser beam is irradiated onto the recorded BCA code which has been recorded as above, a signal with different pulse intervals is obtained from the reflected light. The signal is converted into a binary signal and decoded, thereby obtaining identification information such as a serial number or an identification number, which is BCA data. Thus, an optical disc can be managed based on the decoded identification information.

A specific method of recording the BCA code is described in Japanese Unexamined Patent Application Publication No. 2007-035087, for example.

The optical disc on which the BCA code is not properly recorded is discarded as a defective. Accordingly, original data (hereinafter referred to as BCA data) which forms the BCA code that is written on the discarded optical disc is also discarded. Therefore, if the BCA data of manufactured optical discs are managed using sequence numbers, the sequence number that is assigned to the BCA data of the discarded optical disc is a missing number, which hampers the subsequent product management.

As an apparatus to address such an issue, a BCA recording and reproducing apparatus which includes a means of recording BCA data and a means of reproducing BCA data is described in Japanese Unexamined Patent Application Publication No. 10-289486. The BCA recording and reproducing apparatus reproduces BCA data which is recorded on an optical disc immediately after the BCA data is recorded and then verifies the reproduced data against recording data, thereby determining whether the BCA data is properly recorded. If the BCA data is not properly recorded, the apparatus discards the relevant optical disc and records the same BCA data onto the next optical disc. The BCA data in itself is thereby not discarded, which prevents the occurrence of the issue described above.

SUMMARY

However, it takes a long time to record BCA data on an optical disc and reproduce and verify the recorded BCA data by the BCA recording and reproducing apparatus which is described in Japanese Unexamined Patent Application Publication No. 10-289486. This causes a decrease in the production efficiency of optical discs. Specifically, the BCA recording and reproducing apparatus records BCA data on an optical disc and then reproduces the BCA data which is recorded on the optical disc and verifies whether the BCA data is properly recorded. Thus, the apparatus cannot record the BCA data on the next optical disc while reproducing and verifying the BCA data. Accordingly, the processing takes a longer time than the processing of performing BCA data recording only. Further, the apparatus cannot record the BCA data while removing the optical disc where the recording and reproduction processing end and setting a new optical disc. This also leads to a decrease in production efficiency.

In light of the foregoing, it is desirable to provide an optical disc recording and reproducing apparatus and an optical disc recording and reproducing method which improve the production efficiency by performing data recording and reproduction within substantially the same time as performing data recording only and minimizing a time loss due to optical disc exchange when recording data on an optical disc, reproducing the recorded data and verifying the reproduced data against recording data.

According to an embodiment, there is provided an optical disc recording and reproducing apparatus which includes a first table, a second table and a third table on which an optical disc can be placed, an optical disc recording unit including a first rotating unit to rotate the first table and a recording optical head to record data on the optical disc by irradiating a laser beam onto the optical disc placed on the first table rotated by the first rotating unit, an optical disc reproducing unit including a second rotating unit to rotate the second table and a reproducing optical head to reproduce the data recorded on the optical disc by the optical disc recording unit by irradiating a laser beam onto the optical disc placed on the second table rotated by the second rotating unit, and an optical disc exchanging unit including an ejecting mechanism to eject the optical disc placed on the third table from the third table. The optical disc recording and reproducing apparatus of the embodiment further includes an optical disc moving unit to move the optical disc placed on the first table to the second table and move the optical disc placed on the second table to the third table. The both movements of the optical discs are preferably performed simultaneously. Further, the optical disc recording and reproducing apparatus of the embodiment includes an operation control unit to control operation of the optical disc recording unit, the optical disc reproducing unit and the optical disc exchanging unit. The operation control unit controls each unit so as to perform recording of data onto the optical disc placed on the first table by the optical disc recording unit, reproduction of data recorded on the optical disc placed on the second table by the optical disc reproducing unit, and ejection of the optical disc placed on the third table by the optical disc exchanging unit in parallel.

In the optical disc recording and reproducing apparatus of the embodiment having the above structure, the recording of data onto the optical disc, the reproduction of data recorded on the optical disc and the ejection (exchange) of the optical disc are performed in parallel. Therefore, compared with the case where the recording of data onto the optical disc, the reproduction of the recorded data and the ejection of the reproduced optical disc are performed in series as described in Japanese Unexamined Patent Application Publication No. 10-289486, it is possible to perform data recording and reproduction processing in a short time because of the parallel processing of recording, reproduction and ejection (exchange). It is thereby possible to provide the optical disc recording and reproducing apparatus which improves the production efficiency by performing data recording and reproduction within substantially the same time as performing data recording only and minimizing a time loss due to optical disc exchange.

It is preferred that the tables are arranged in such a way that the first table is adjacent to the second table at a prescribed distance apart, and the second table is adjacent to the third table at the same prescribed distance apart. Because the distance between the tables is the same in this structure, it is convenient when moving the optical disc from one table to another. The prescribed distance is a certain distance, which may be set to a given length in light of an apparatus installation space, the need for space saving and so on.

Further, in this case, the optical disc moving unit preferably includes an optical disc moving table, a moving table moving unit, a working table moving unit and a movement control unit. The optical disc moving table has at least three holes so that at least three optical discs can be placed with the prescribed distance apart. The moving table moving unit moves the optical disc moving table above the first table, the second table and the third table. The working table moving unit moves the first table, the second table and the third table relatively to the hole in an axial direction of the optical disc to be placed in the hole. The movement control unit controls movement of the optical disc moving table by the moving table moving unit in such a way that the holes of the optical disc moving table are respectively located above the first table, the second table and the third table sequentially and controls the working table moving unit so as to perform first operation that projects the first table, the second table and the third table from the holes of the optical disc moving table when the holes are located above the first table, the second table and the third table, and second operation that buries the first table, the second table and the third table projected from the holes by the first operation into the holes.

In this structure, when the working table moving unit performs the first operation, if the optical disc is placed in the hole of the optical disc moving table, the optical disc which is placed in the hole is delivered to the table which is located therebelow (any one of the first table, the second table and the third table, which are hereinafter referred to collectively as the working table) by the first operation. Further, when the working table moving unit performs the second operation, if the optical disc is placed on the working table, the optical disc which is placed on the working table is delivered to the hole which is located therebelow by the second operation. In this manner, according to the embodiment, the optical disc is delivered between each working table and the optical disc moving table using that the relative positional relationship between the working table and the hole of the optical disc moving table changes by the first operation and the second operation. It is thereby possible to move the optical disc to each working table efficiently.

It is preferred that the third table is adjacent to the first table at the same prescribed distance apart, the optical disc moving table has the three holes, and the moving table moving unit rotates the optical disc moving table. It is further preferred that the movement control unit controls rotation of the optical disc moving table by the moving table moving unit in such a way that the three holes of the optical disc moving table are respectively located above the first table, the second table and the third table sequentially. In this structure, the distance between the first table and the second table, the distance between the second table and the third table, and the distance between the third table and the first table are equal, that is, the three working tables are arranged to form a regular triangular shape. Correspondingly, the optical disc moving table has a circular disc shape, and three circular holes are formed at regular intervals (at intervals of 120°) along the circumference. By the rotation of the optical disc moving table, each hole is sequentially located above each table. Such a structure enables size reduction of the apparatus.

In this case, the optical disc exchanging unit preferably includes an input mechanism to place the optical disc on the third table. Further preferably, the optical disc moving unit moves the optical disc placed on the first table to the second table, moves the optical disc placed on the second table to the third table, and further moves the optical disc placed on the third table by the input mechanism to the first table. In this structure, the optical disc which is placed on the third table is ejected by the ejecting mechanism and a new optical disc is placed on the third table by the input mechanism. The use of the table for optical disc ejection and the table for optical disc insertion in common contributes to size reduction of the apparatus. The ejecting mechanism and the input mechanism may be implemented by the same mechanism part. This simplifies the structure of the optical disc exchanging unit.

Further, the operation control unit and the movement control unit preferably control the operation and the movement of each unit in association with each other, so that the recording of data onto the optical disc by the optical disc recording unit, the reproduction of data recorded on the optical disc by the optical disc reproducing unit, and the exchange (ejection and placement) of the optical disc by the optical disc exchanging unit are performed in parallel after the first operation, and then the second operation is performed after that. By controlling each unit in this order, the placement of the optical disc on the working table by the first operation, the recording, reproduction and exchange processing in each working table after the placement of the optical disc on the working table, and the delivery of the optical disc to the optical disc moving table by the second operation after the end of those processing are performed in this order. Furthermore, the movement control unit preferably controls the working table moving unit and the moving table moving unit so as to perform the rotation of the optical disc moving table by the moving table moving unit after the second operation and then performs the first operation after that. The optical disc which is delivered to the optical disc moving table by the second operation is thereby located above the next working table by the rotation of the optical disc moving table, and then the optical disc in the hole of the optical disc moving table is placed on the next working table by the subsequent first operation. By performing the above operation successively in this order, it is possible to perform the recording of data onto the optical disc, the reproduction of the recorded data and the exchange of the optical disc most efficiently.

Further, the above-described operation control unit preferably includes a storage unit to store a plurality of pieces of data in a prescribed order so as to record different data onto the different optical discs by the optical disc recording unit, a data output unit to output the data stored in the storage unit to the optical disc recording unit in accordance with the prescribed order, and a verifying unit to compare recording data output from the data output unit with data recorded on the optical disc based on the recording data by the optical disc recording unit and reproduced by the optical disc reproducing unit and determine whether data recording onto the optical disc is properly performed. Because the data is thereby recorded onto the optical disc in accordance with the sequence of the recoding data which is output from the storage unit, this structure facilitates the management of the optical disc on which data is recorded.

In this case, the operation control unit preferably includes a data sequence reorganizing unit to reorganize a data sequence in such a way that an order of the data stored in the storage unit is brought down by one when the verifying unit determines that data recording is not properly performed, and the recording data used when the verifying unit determines that data recording is not properly performed is set as data to be output next from the data output unit. For example, the optical disc recording unit records the (n−1)th data onto the optical disc, the optical disc reproducing unit reproduces the data which is recorded on the optical disc, and the reproduced data is compared with the (n−1)th data (recording data). If the verification result is failure, that is, when the recording data and the reproduced data do not match and recording of the recording data is not properly performed, the data sequence reorganizing unit brings down the order of the data which is stored in the storage unit by one and inserts the (n−1)th data, which is the recording data, into the data to be output next from the storage unit. When the optical disc on which the (n−1)th data is recorded is reproduced, the n-th data is recorded on the next optical disc by the optical disc recording unit. Thus, the data to be output from the storage nit to the optical disc recording unit after the verification result is output is the (n+1)th data. Accordingly, the (n+m)th (m=1, 2, 3, . . . ) data which is stored in the storage unit is drought down to the (n+m+1)th data, and the (n−1)th data is inserted into the (n+1)th data. If the data is reorganized in this manner, it is possible to reuse the data which has been recorded on the optical disc that is rejected by verification without discarding it.

Further, in this case, the optical disc recording and reproducing apparatus preferably includes a transfer control unit to control the optical disc exchanging unit, and the transfer control unit preferably controls the optical disc exchanging unit so as to perform the following operation:

Normal operation to transfer the optical disc determined that data recording is properly performed by the verifying unit from the third table to a first position;

Abnormal operation to transfer the optical disc determined that data recording is not properly performed by the verifying unit from the third table to a second position;

Hold operation to transfer the first optical disc determined that data recording is not properly performed and then determined that data recording is properly performed by the verifying unit from the third table to a third position; and Return operation to transfer the optical disc transferred to the third position to the first position after the first normal operation performed after the hold operation.

In this structure, the optical disc whose verification result by the verifying unit is suitable is transferred to the first position (accepted product storage site), and the optical disc whose verification result is failure is transferred to the second position (rejected product storage site). Further, the first storage disc whose verification result by the verifying unit is suitable after it has been failure is transferred to the third position (held product storage site). The optical disc which is transferred to the third position is transferred to the first position after the first optical disc whose verification result by the verifying unit is suitable is transferred to the first position. For example, it is assumed that the data which is recorded on the optical disc which is determined to be failure by the verification result of the verifying unit is the (n−1)th data, and the optical disc on which the n-th data, which is the next data, is recorded is transferred to the third position. In such a case, the (n−1)th data which is used when the verification results in failure is inserted into the (n+1)th data. Then, by the return operation, the optical disc on which the (n+1)th data is recorded is transferred to the first position precedently, and the optical disc on which the n-th data is recorded, which has been transferred to the third position, is transferred to the first position after that. Because the (n+1)th data is the (n−1)th data as described earlier, the sequence of the data which is recorded on the optical disc to be transferred to the first position is in the order of the (n−1)th data and the n-th data, and the data sequence is right. As described above, according to the embodiment, it is possible to maintain the data sequence without changing the order of the data which is recorded on the optical disc whose verification result is suitable, which further facilitates the management of the optical discs.

Further, in this case, if the optical disc exchanging unit performs the abnormal operation an even number of times in succession, the transfer control unit preferably controls the optical disc exchanging unit so as to perform the normal operation without performing the hold operation on the first optical disc which is determined that data recording is properly performed by the verifying unit after that. For example, if the verification result of the optical disc on which the (n−1)th data is recorded is failure, the data sequence reorganizing unit changes the sequence of the data in the storage unit into the order of: n−1, n+1, n+2, . . . (the n-th data is currently recorded onto the optical disc). If the verification result of the optical disc on which the n-th data is recorded is also failure, the data sequence reorganizing unit changes the sequence of the data in the storage unit into the order of: n, n+1, n+2, . . . (the (n−1)th data is currently recorded onto the optical disc). The data sequence thereby returns to its original state. Accordingly, if the failure determination of the verification result occurs an even number of times in succession and the abnormal operation by the transfer control unit is performed an even number of times in succession, the data sequence in the storage unit is back to its original sequence and therefore there is no need to perform the hold operation.

If the data which is recorded by the optical disc recording unit and the data which is reproduced by the optical disc reproducing unit are identification data of the optical disc such as BCA data, the apparatus according to the embodiment can be used most effectively.

It is also preferred that the working table moving unit includes a fixing portion to fix the first table, the second table, the third table, the first rotating unit and the second rotating unit, and an up/down unit to move up/down the fixing portion so as to perform the first operation and the second operation. In this structure, the three tables move up/down as a unit and perform the first operation and the second operation. If the moving table moving unit rotates the optical disc moving table in combination therewith, it is possible to manufacture the optical disc recording and reproducing apparatus of the embodiment with a simple structure.

The holes of the optical disc moving table may have a portion which is not blocked by the optical disc when the optical disc is placed, on a front side of a moving direction of the optical disc moving table. In this structure, the air current which is generated by the movement of the optical disc moving table flows through the portion which is not blocked, thereby preventing the air current from affecting the optical disc which is placed in the hole. It is thereby possible to avoid that the air current strikes the optical disc and the optical disc is levitated from the optical disc moving table.

According to another embodiment, there is provided an optical disc recording and reproducing method which includes the steps of performing a processing process executing a recording process to record data on an optical disc by irradiating a laser beam onto the optical disc placed on a first table on which the optical disc can be placed, a reproducing process to reproduce data recorded by the recording process by irradiating a laser beam onto the optical disc placed on a second table on which the optical disc can be placed, and an optical disc exchanging process including an ejecting process to eject the optical disc placed on a third table on which the optical disc can be placed from the third table in parallel, and performing, after the processing process ends, an optical disc moving process including a first moving process to move the optical disc placed on the first table to the second table and a second moving process to move the optical disc placed on the second table to the third table. According to this method, it is possible to provide the optical disc recording and reproducing method which improves the production efficiency by performing data recording and reproduction within substantially the same time as performing data recording only and minimizing a time loss due to optical disc exchange.

In the above-described method, it is preferred that the optical disc exchanging process further includes an inserting process to insert a different optical disc onto the third table after ejecting the optical disc from the third table, and the optical disc moving process further includes a third moving process to move the optical disc placed on the third table to the first table after the processing process. This enables size reduction of the apparatus structure which is used in the recording and reproducing method according to the embodiment.

It is further preferred that the reproducing process includes a verifying process to verify data reproduced in the reproducing process against data used when recording the data in the recording process and determine whether data is properly recorded on the optical disc, and the optical disc exchanging process transfers the optical disc determined that data is properly recorded by the verifying process from the third table to a first position and transfers the optical disc determined that data is not properly recorded by the verifying process from the third table to a second position. Further, when the verifying process determines that data is not properly recorded, it is preferred to record the data which is previously recorded on the optical disc that is determined that the data is not properly recorded again in the recording process in a subsequent processing process to the processing process. Because this method records the data which has been recorded on the optical disc that is determined to be failure in the verifying process onto another optical disc again, it is possible to effectively use the data without discarding it.

Additional features and advantages are described herein, and will be apparent from the following Detailed Description and the figures.

DETAILED DESCRIPTION

Figure 1:
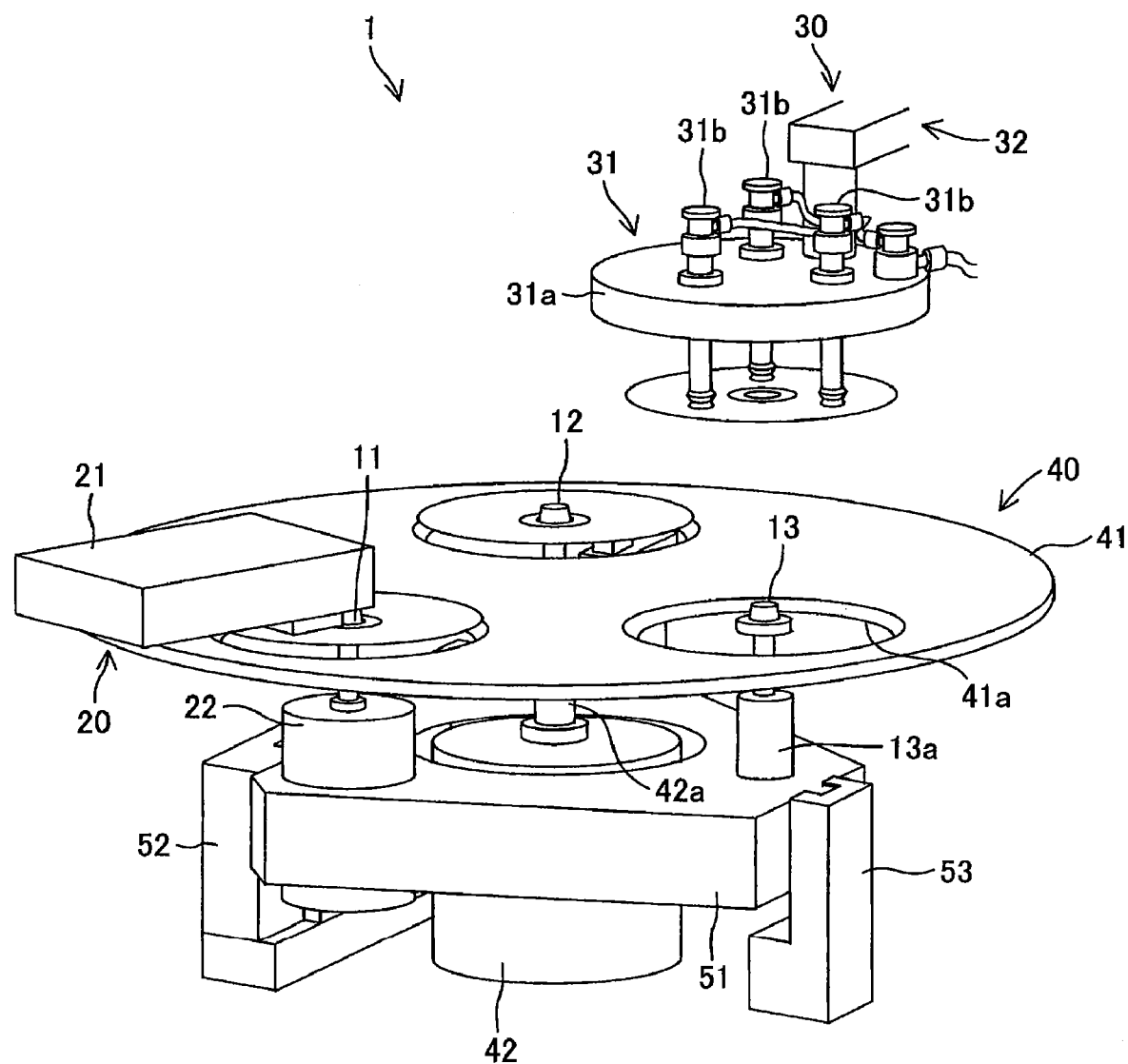
FIG. 1 is a schematic view showing a mechanism part of a BCA recording and reproducing apparatus according to an embodiment, which illustrates the state where each table is lifted.

The present application will be described in detail with reference to the appended drawings according to embodiments. Note that, in this specification and the appended drawings, structural elements that have substantially the same function and structure are denoted with the same reference numerals, and repeated explanation of these structural elements is omitted.

Figure 2:
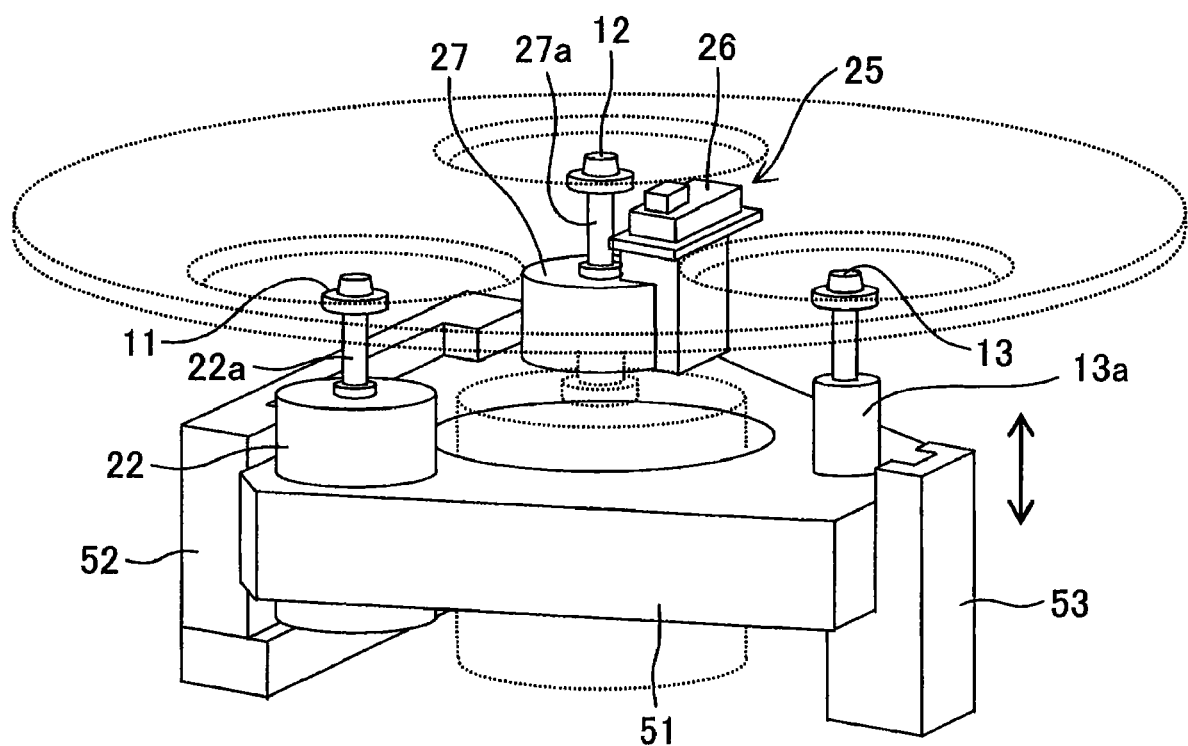
FIG. 2 is a schematic view showing a part of a mechanism part of a BCA recording and reproducing apparatus according to an embodiment of the present

FIG. 1 is a view which shows the structure of a mechanism part of a BCA recording and reproducing apparatus, which is an optical disc recording an reproducing apparatus according to an embodiment. FIG. 2 is a view which shows a portion that is hidden in FIG. 1 by eliminating a recording optical head and an optical disc exchanging unit, which are described later, from FIG. 1 and drawing an optical disc moving table in a dotted line. A BCA recording and reproducing apparatus 1 includes a recording turntable (first table) 11, a reproducing turntable (second table) 12, and an exchanging table (third table) 13. An optical disc can be placed on each of those working tables.

Further, the BCA recording and reproducing apparatus 1 includes an optical disc recording unit 20. The optical disc recording unit 20 includes a recording optical head 21, a first spindle motor 22 and a recording optical head control circuit 103 (cf. FIG. 4). The recording optical head 21 has various parts for irradiating a laser beam onto an optical disc and recording data, such as a recording laser light source, an objective lens and so on. The recording optical head 21 emits a laser beam according to a direction from a controller (control unit), which is not shown in FIG. 1. The laser beam emitted from the recording optical head 21 is irradiated onto the BCA of the optical disc which is placed on the recording turntable 11. By the irradiation of the laser beam from the recording optical head 21, a BCA code is formed on the optical disc. The first spindle motor 22 is a driving portion (first rotating unit) to rotate the recording turntable 11, and it is connected to the recording turntable 11 through an output shaft 22a. By the rotation of the output shaft 22a, a turning force is transmitted to the recording turntable 11, thereby rotating the recording turntable 11.

The BCA recording and reproducing apparatus 1 further includes an optical disc reproducing unit 25 (cf. FIG. 2). The optical disc reproducing unit 25 includes a reproducing optical head 26, a second spindle motor 27, and a reproducing optical head control circuit 105 (cf FIG. 4). The reproducing optical head 26 has various parts for irradiating a laser beam onto an optical disc and reproducing the data recorded on the optical disc, such as a reproducing laser light source, a photodetector and so on. The reproducing optical head 26 emits a laser beam according to a direction from a controller, which is not shown. The laser beam emitted from the reproducing optical head 26 is irradiated onto the BCA of the optical disc which is placed on the reproducing turntable 12. The reflected light of the irradiated laser beam is received by the photodetector, and the BCA data which is recorded on the optical disc is reproduced based on the received light signal. The second spindle motor 27 is a driving portion (second rotating unit) to rotate the reproducing turntable 12, and it is connected to the reproducing turntable 12 through an output shaft 27a. By the rotation of the output shaft 27a, a turning force is transmitted to the reproducing turntable 12, thereby rotating the reproducing turntable 12.

The BCA recording and reproducing apparatus 1 further includes an optical disc exchanging device 30 (optical disc exchanging unit). The optical disc exchanging device 30 operates as an ejecting mechanism which ejects the optical disc that is placed on the exchanging table 13 and an input mechanism which places a new optical disc on the exchanging table 13. The optical disc exchanging device 30 includes a grasping portion 31 which grasps an optical disc and a driving mechanism 32 which moves the grasping portion 31. The grasping portion 31 has a circular disc-shaped supporting portion 31a and three attaching portion 31b which are supported by the supporting portion 31a. Each attaching portion 31b has a rod-like shape, and a passage hole is formed inside. The passage hole is connected to a suction source of air, which is not shown. The suction source sucks air and thereby the air in the passage hole is sucked, so that a sucking force is generated at the end of the attaching portion 31b. The grasping portion 31 attaches and grasps an optical disc by the sucking force. The driving mechanism 32 is connected to the grasping portion 31 and moves the grasping portion 31. The detailed structure of the driving mechanism 32 is omitted.

Further, the BCA recording and reproducing apparatus 1 includes an optical disc moving unit 40. The optical disc moving unit 40 moves the optical disc which is placed on the recording turntable 11 to the reproducing turntable 12, moves the optical disc which is placed on the reproducing turntable 12 to the exchanging table 13, and moves the optical disc which is placed on the exchanging table 13 to the recording turntable 11. The optical disc moving unit 40 includes an optical disc moving table 41, a moving table rotating motor 42 (moving table moving unit) which rotates the optical disc moving table 41, and a moving table rotation control circuit 108 (cf. FIG. 4). The optical disc moving table 41 has a circular disc-shape as shown in the figure. The optical disc moving table 41 has three holes 41a which are arranged at regular intervals (at intervals of 120°) along the circumference. Each hole 41a has a circular shape with the same diameter. The edge of the hole 41a is tapered, and the diameter at the upper side in the figure is slightly larger than the diameter of an optical disc, and the diameter at the lower side in the figure is slightly smaller than the diameter of an optical disc. Therefore, if an optical disc is put on the hole 41a, the optical disc is held at the middle of the edge of the hole 41a, and the optical disc is thereby placed in the hole 41a. The moving table rotating motor 42 is located under the optical disc moving table 41, and an output shaft 42a is connected at the center of the under part of the optical disc moving table 41. If the moving table rotating motor 42 is driven to rotate, the optical disc moving table 41 rotates around the output shaft 42a.

The recording turntable 11, the reproducing turntable 12 and the exchanging table 13 are arranged in such a way that, when optical discs are respectively placed thereon, the orientations of the optical discs are parallel with each other. Further, the distance between the central axes of the optical discs which are respectively placed on the working tables is equal. Specifically, the working tables are arranged in such a way that the recording turntable 11 is adjacent to the reproducing turntable 12 at a prescribed distance apart, the reproducing turntable 12 is adjacent to the exchanging table 13 at the same distance as the prescribed distance apart, and the exchanging table 13 is adjacent to the recording turntable 11 at the same distance as the prescribed distance apart. Thus, the positional relationship of the three tables is that each table is at each apex of a regular triangle when viewed from above in FIG. 1.

The optical disc moving table 41 is arranged in such a way that it is parallel with an optical disc when an optical disc is placed on each working table. Further, the optical disc moving table 41 is arranged in such a way that the distance from its rotation center to each of the three working tables is equal. Furthermore, the distance from the center of each of the three holes 41a in the optical disc moving table 41 to the rotation center of the optical disc moving table 41 is also equal, and the distance is equal to the distance from the rotation center of the optical disc moving table 41 to each working table. Accordingly, when one of the holes 41a is positioned opposite to any one table, the other two holes 41a are also positioned opposite to the other two tables.

The BCA recording and reproducing apparatus 1 also includes a fixing portion 51, an up/down portion 52 (up/down unit), and a guide portion 53. The fixing portion 51 fixes the first spindle motor 22, the second spindle motor 27 and the third table 13, and it has a substantially triangle pole shape as shown in the figure. Because the first spindle motor 22 and the second spindle motor 27 are fixed to the fixing portion 51, the recording turntable 11 and the reproducing turntable 12 which are respectively connected to those motors are also fixed to the fixing portion 51. A cylindrical recess is formed at the center of the fixing portion 51, and the moving table rotating motor 42 is disposed in the recess. The exchanging table 13 is connected to the fixing portion 51 through a columnar supporting member 13a.

The up/down portion 52 and the guide portion 53 are coupled to the fixing portion 51. The up/down portion 52 is disposed along one side surface of the fixing portion 51 and moves up and down the fixing portion 51 in the direction that is parallel with the central axis of an optical disc which is to be placed on each working table. This is the same direction as the axial direction of an optical disc which is to be placed in the hole 41a of the optical disc moving table 41. The up/down portion 52 may be a solenoid having a moving portion (such as a movable core), for example, and it moves up and down the fixing portion 51 by securing the moving portion to the fixing portion 51 and lifting or lowering the moving portion momentary using an electromagnetic force. When the fixing portion 51 moves up, the recording turntable 11, the reproducing turntable 12 and the exchanging table 13 also move up accordingly and then stop at a position where they are lifted by a predetermined amount (the up position). FIG. 1 shows the state where the working tables stop at the up position. As shown in FIG. 1, when the working tables are at the up position, each working table projects from each hole 41a of the optical disc moving table 41. Thus, an optical disc which is placed on each table is located above the hole 41a in this state.

Figure 3:
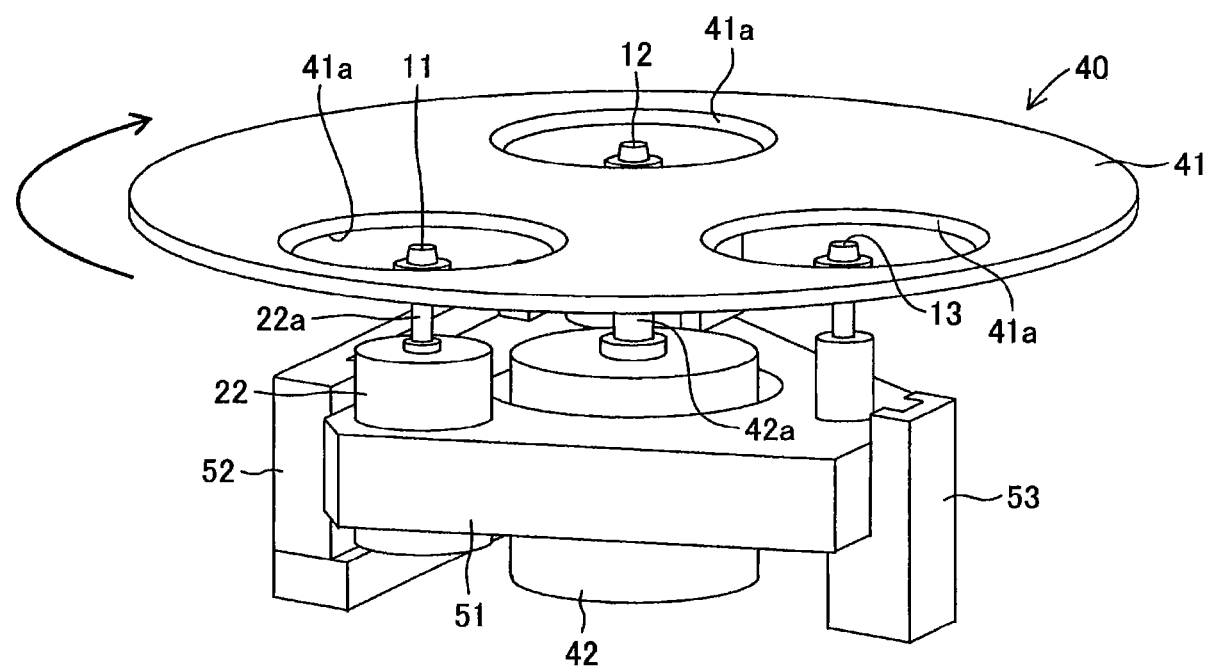
FIG. 3 is a schematic view showing a mechanism part of a BCA recording and reproducing apparatus according to an embodiment, which illustrates the state where each table is lowered.

On the other hand, when the fixing portion 51 moves down, the recording turntable 11, the reproducing turntable 12 and the exchanging table 13 also move down accordingly and then stop at a position where they are lowered by a predetermined amount (the down position). FIG. 3 shows the overall view of the mechanical part of the BCA recording and reproducing apparatus 1 in this state. As shown in FIG. 3, when the working tables are at the down position, each working table is buried in each hole 41a of the optical disc moving table 41 and located lower than the hole 41a. Thus, the hole 41a is located above each working table. In this manner, the fixing portion 51 and the up/down portion 52 serve as a working table moving unit which moves the recording turntable 11, the reproducing turntable 12 and the exchanging table 13 in the axial direction of an optical disc which is to be placed in the hole 41a of the optical disc moving table 41 (i.e. the rotation axis direction of the optical disc moving table), relatively to the hole 41a. As the up/down portion 52, a screw feed mechanism such as a ball screw or a direct acting mechanism such as an air cylinder or a hydraulic cylinder may be employed.

A guide rail (not shown) is formed in the guide portion 53, and the fixing portion 51 is engaged with the guide rail. The guide rail allows the up/down movement of the fixing portion 51 and restricts the movement of the fixing portion 51 in the other directions.

The outline of the operation of the BCA recording and reproducing apparatus 1 is described hereinbelow. The initial state is the still state where an optical disc is set in each hole 41a of the optical disc moving table 41, each hole 41a is located above each of the turntables 11 and 12 and the exchanging table 13, and each hole 41a is positioned opposite to each table. From this state, the fixing portion 51 moves up. When the fixing portion 51 moves up, the recording turntable 11, the reproducing turntable 12 and the exchanging table 13 move up accordingly. By this move-up, each working table operates so as to project upward from the opposite hole 41a (first operation). By such relative movement of the working tables 11, 12 and 13 with respect to the holes 41a, each working table receives the optical disc which is placed in the opposite hole 41a. The optical disc is thereby placed on each working table.

The optical disc which is placed on the recording turntable 11 rotates by the rotation driving of the first spindle motor 22. Then, the recording laser beam which is emitted from the recording optical head 21 is irradiated, and thereby BCA data is recorded (recording process). In this embodiment, an optical disc is set to each working table with the label surface of the optical disc facing upward in the figure. Then, the recording laser beam is irradiated onto the label surface side of the optical disc. This allows BCA data to be recorded on the deep layer side if the optical disc has a multilayer structure. Alternatively, BCA data may be recorded on the optical disc by irradiating the recording laser beam onto the recording surface which is the counter side of the label surface.

The optical disc which is placed on the reproducing turntable 12 rotates by the rotation driving of the second spindle motor 27. The reproducing laser beam which is emitted from the reproducing optical head 26 is irradiated onto the BCA of the optical disc. The reproducing optical head 26 receives the reflected light of the reproducing laser beam which is irradiated onto the optical disc and reproduces the BCA data based on the received reflected light (reproducing process). In this embodiment, the reproducing laser beam is irradiated onto the recording surface of the optical disc which is the counter side of the label surface.

The grasping portion 31 of the optical disc exchanging device 30 moves closer to the exchanging table 13. Then, the optical disc which is placed on the exchanging table 13 is attached to the attaching portion 31b. The optical disc is thereby ejected from the exchanging table 13 (ejecting process). After that, the attaching portion 31b attaches a new, different optical disc, moves the attached new optical disc to the position above the exchanging table 13 and releases the attachment. The new optical disc is thereby placed on the exchanging table 13 (inserting process. The ejecting process and the inserting process are collectively referred to as an optical disc exchanging process). New optical discs to be supplied to the exchanging table 13 are stacked in a stock storage position, though not shown. The optical disc which is ejected from the exchanging table 13 is transferred to any one position of a normal position, an abnormal position and a hold position according to the control described later.

The recording of BCA data onto an optical disc by the optical disc recording unit 20, the reproduction of BCA data recorded on an optical disc by the optical disc reproducing unit 25, and the exchange of an optical disc (ejection and placement of a new optical disc) by the optical disc exchanging device 30 which are described in the foregoing are performed in parallel in each working table (processing process). The control is performed by the controller (operation control unit, movement control unit), which is described later, controlling the optical disc recording unit 20, the optical disc reproducing unit 25 and the optical disc exchanging device 30. After that, the fixing portion 51 moves down. When the fixing portion 51 moves down, the recording turntable 11, the reproducing turntable 12 and the exchanging table 13 also move down. By the move-down, each working table operates so as to be buried in the opposite hole 41a (second operation). By the relative movement of the working tables 11, 12 and 13 with respect to the holes 41a, the optical disc which is placed on each working table is delivered to the opposite hole 41a. The optical disc is thereby placed on the optical disc moving table 41.

After that, the moving table rotating motor 42 is driven to rotate. The optical disc moving table 41 thereby rotates (moves) by 120° in one direction above the recording turntable 11, the reproducing turntable 12 and the exchanging table 13. By the rotation, the hole 41a where the optical disc which is delivered from the recording turntable 11 is placed moves to the position above the reproducing turntable 12 (first moving process), the hole 41a where the optical disc which is delivered from the reproducing turntable 12 is placed moves to the position above the exchanging table 13 (second moving process), and the hole 41a where the optical disc which is delivered from the exchanging table 13 is placed moves to the position above the recording turntable 11 (third moving process). After the rotation of the optical disc moving table 41 ends, the fixing portion 51 moves up. By the move-up, each working table receives the optical disc from the opposite hole 41a. The optical disc is thereby placed on each working table to which it has moved (optical disc moving process).

By repeating the processing process and the optical disc moving process, the optical disc which is set to each table sequentially moves to the recording turntable 11, the reproducing turntable 12 and the exchanging table 13, and the relevant processing is performed in each table. The optical disc which has moved to the exchanging table 13 is ejected by the optical disc exchanging device 30 and transferred to a given place. Further, the optical disc exchanging device 30 places new optical discs on the exchanging table 13 one after another from a stock storage position. The new optical discs then go through the BCA data recording process and reproducing process sequentially.

Figure 4:
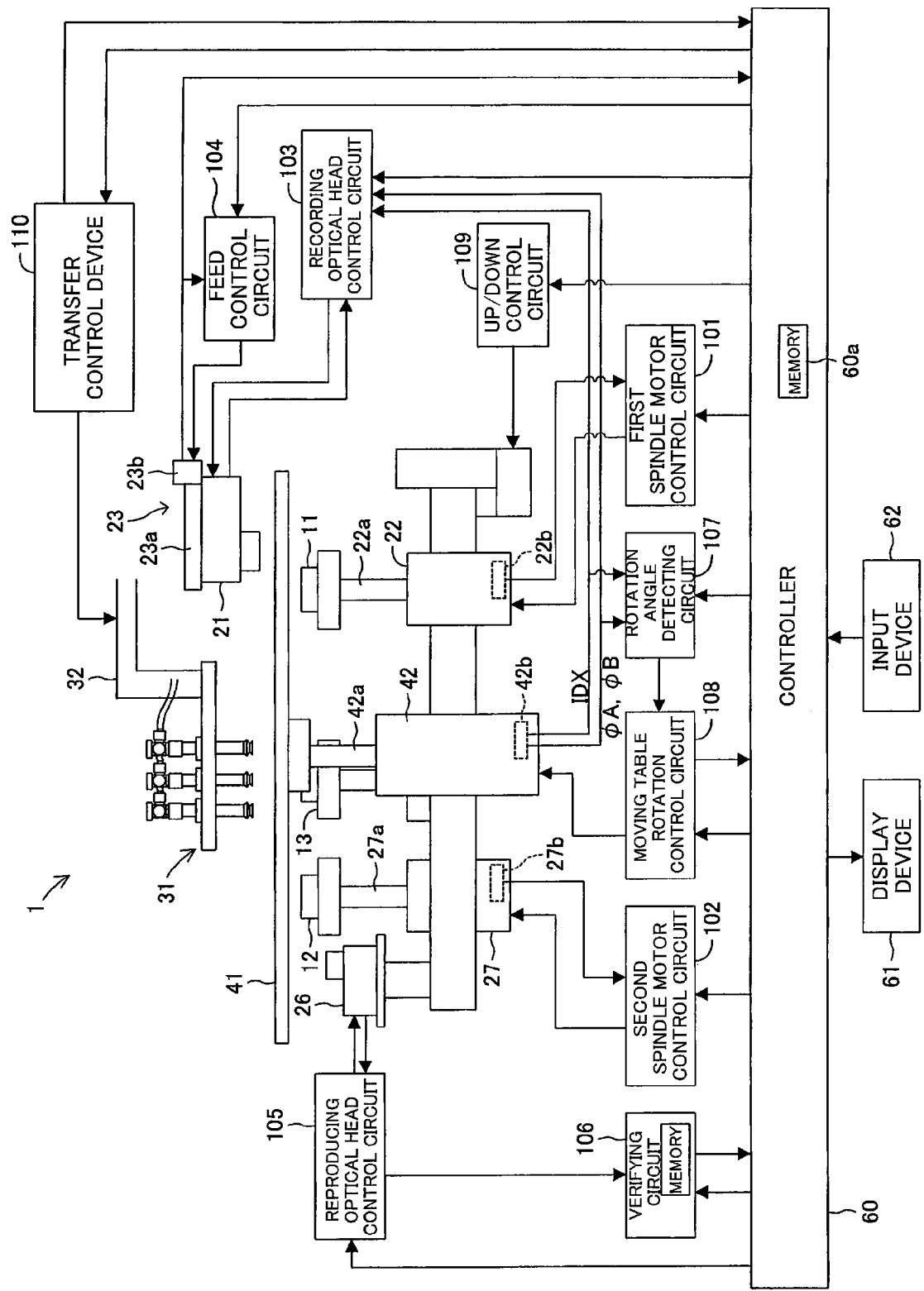
FIG. 4 is a schematic view showing the overall structure including a mechanism part and a control circuit of a BCA recording and reproducing apparatus according to an embodiment.

FIG. 4 is a view showing the overall structure including a mechanism part and a control circuit of the BCA recording and reproducing apparatus 1 according to the embodiment. Referring to FIG. 4, in addition to the mechanism part described earlier, the BCA recording and reproducing apparatus 1 includes various control circuits such as a first spindle motor control circuit 101, a second spindle motor control circuit 102, a recording optical head control circuit 103, a feed control circuit 104, a reproducing optical head control circuit 105, a verifying circuit 106, a rotation angle detecting circuit 107, a moving table rotation control circuit 108 and an up/down control circuit 109. The BCA recording and reproducing apparatus 1 further includes a controller 60, a display device 61 and an input device 62. The controller 60 performs the overall control of the apparatus 1. The controller 60 is equivalent to an operation control unit of the embodiment, and it controls the operation of the optical disc recording unit 20, the optical disc reproducing unit 25 and the optical disc exchanging device 30 so as to control the recording of data onto an optical disc by the optical disc recording unit 20, the reproduction of data recorded on an optical disc by the optical disc reproducing unit 25, and the exchange of an optical disc by the optical disc exchanging device 30 in such a way that those processing are performed in parallel. The controller 60 is also equivalent to a movement control unit of the embodiment, and it controls the movement of the optical disc moving table 41 in such a that the three holes 41a of the optical disc moving table 41 are located above the recording turntable 11, the reproducing turntable 12 and the exchanging table 13 and also controls the up/down portion 52 in such a way that the first operation is performed when the hole 41a is located above each working table, and the second operation is performed when each working table projects from each hole 41a by the first operation.

The first spindle motor control circuit 101 receives a pulse signal from an encoder 22b which is included in the first spindle motor 22 and calculates the rotation speed of the first spindle motor 22 based on the number of pulses per unit time of the input pulse signal. The first spindle motor control circuit 101 then controls the driving of the first spindle motor 22 so that the calculated rotation speed becomes a target rotation speed which is input from the controller 60. The second spindle motor control circuit 102 receives a pulse signal from an encoder 27b which is included in the second spindle motor 27 and calculates the rotation speed of the second spindle motor 27 based on the number of pulses per unit time of the input pulse signal. The second spindle motor control circuit 102 then controls the driving of the second spindle motor 27 so that the calculated rotation speed becomes a target rotation speed which is input from the controller 60.

The recording optical head control circuit 103 is a part of the optical disc recording unit 20. The recording optical head control circuit 103 includes circuits for executing various processing and controls the recording laser beam which is emitted from the recording optical head 21 in general. Specifically, the recording optical head control circuit 103 performs encoding of the BCA code which is supplied from the controller 60, control of the emission intensity and the emission time (pulse width) of the recording laser beam which is emitted from the recording optical head 21, control of the pulse emission interval of the recording laser beam by the rotation speed of the optical disc placed on the recording turntable 11, focus servo control, focus lead-in processing and so on.

The recording optical head 21 is mounted to a feed mechanism 23 as shown in FIG. 4. The feed mechanism 23 includes a mounting portion 23a for fixing the recording optical head 21 and a feed motor 23b for moving the mounting portion 23a. By the driving of the feed motor 23b, the recording optical head 21 and the mounting portion 23a move in the radial direction of the optical disc which is placed on the recording turntable 11. An encoder is included in the feed motor 23b, and a pulse signal which is output from the encoder is input to the feed control circuit 104 and the controller 60. Based on the input pulse signal, the feed control circuit 104 calculates the moving speed (feeding speed) and the moving amount (feeding amount) of the recording optical head 21 in the radial direction of the optical disc which is placed on the recording turntable 11. Then, the feed control circuit 104 controls the driving of the feed motor 23b so that the calculated feeding speed becomes a target feeding speed which is input from the controller 60.

The reproducing optical head control circuit 105 also includes various circuits and performs control of the reproducing laser beam which is emitted from the reproducing optical head 26 and processing of the received reflected light in general. Specifically, the reproducing optical head control circuit 105 performs control of the emission intensity of the reproducing laser beam which is emitted from the reproducing optical head 26, focus servo control, focus lead-in processing, generation of a reproduced signal from the received reflected light, decoding of a reproduced signal and so on.

The verifying circuit 106 receives BCA data to be recorded (recording data) from the controller 60 and also receives decoded BCA data (reproduced data) from the reproducing optical head control circuit 105. The verifying circuit 106 then verifies the reproduced data against the recording data, determines whether the reproduced data is the same as the recording data, and outputs a verification result to the controller 60.

The rotation angle detecting circuit 107 receives a pulse signal (φA signal, (φB signal) from an encoder 42b which is included in the moving table rotating motor 42. The rotation angle detecting circuit 107 calculates a value corresponding to the rotation angle of the moving table rotating motor 42 by counting the number of pulses of the pulse signal and outputs the calculated value to the moving table rotation control circuit 108. The rotation angle detecting circuit 107 also receives an index signal IDX from the encoder 42b, and it resets the pulse number count value to 0 in response to the input of the index signal IDX. Thus, the rogation angle upon input of the index signal IDX is 0°. The moving table rotation control circuit 108 receives a target rotation angle of the optical disc moving table 41 from the controller 60. The moving table rotation control circuit 108 then controls the rotation of the moving table rotating motor 42 until an equivalent value to the rotation angle of the moving table rotating motor 42 which is input from the rotation angle detecting circuit 107 becomes equal to the target rotation angle. The rotation control of the moving table rotating motor 42 by the moving table rotation control circuit 108 is a program control which causes acceleration and deceleration based on the equivalent value to the rotation angle which is input from the moving table rotating motor 42 so that the optical disc moving table 41 stops when it rotates at the target rotation angle which is input from the controller 60. Further, the moving table rotation control circuit 108 outputs a signal indicating the end of rotation (rotation end signal) to the controller 60 when the rotation angle of the optical disc moving table 41 reaches the target rotation angle.

The up/down control circuit 109 receives an up direction or a down direction from the controller 60. When the up/down control circuit 109 receives the up direction, it moves up the fixing portion 51 by applying power to a magnetic solenoid of the up/down portion 52, which is not shown. When, on the other hand, the up/down control circuit 109 receives the down direction, it moves down the fixing portion 51 by stopping the application of power to the magnetic solenoid. In the initial state, power is not applied the magnetic solenoid, and therefore the fixing portion 51 is at the down position.

The BCA recording and reproducing apparatus 1 further includes a transfer control device 110. The transfer control device 110 controls the driving of the grasping portion 31 and the driving mechanism 32 of the optical disc exchanging device 30. An optical disc exchange direction is input to the transfer control device 110 from the controller 60. When the direction is input, the optical disc exchanging device 30 moves the optical disc which is placed on the exchanging table 13 to any one of the normal position, the abnormal position and the hold position and then places a new optical disc from the stock storage position on the exchanging table 13. After the placement ends, the transfer control device 110 outputs a signal indicating an end (exchange end signal) to the controller 60. If, as a result of verification in the verifying circuit 106, the verifying circuit 106 determines that reproduced data does not match recording data, a direction to respond to abnormality is input to the transfer control device 110 from the controller 60. The transfer destination of the optical disc which is placed on the exchanging table 13 is determined based on the presence or absence of the input of the abnormality response direction. The grasping portion 31 of the optical disc exchanging device 30 includes a sensor for detecting an optical disc in the stock storage position, and if a new optical disc runs out in the stock storage position, it outputs a signal indicating the absence of stock of an optical disc (stock end signal) to the controller 60.

In the BCA recording and reproducing apparatus 1 having such a structure, a worker places optical discs on which a BCA code is to be recorded in the stock storage position and directs the start of operation through the input device 62. The BCA data to be recorded on optical discs is prestored in a memory 60a (storage unit) of the controller 60. The memory 60a stores a plurality of pieces of data in corresponding to a data number counter n, which is described later, in a prescribed sequence in order that different BCA data is stored for each optical disc.

Figure 5:
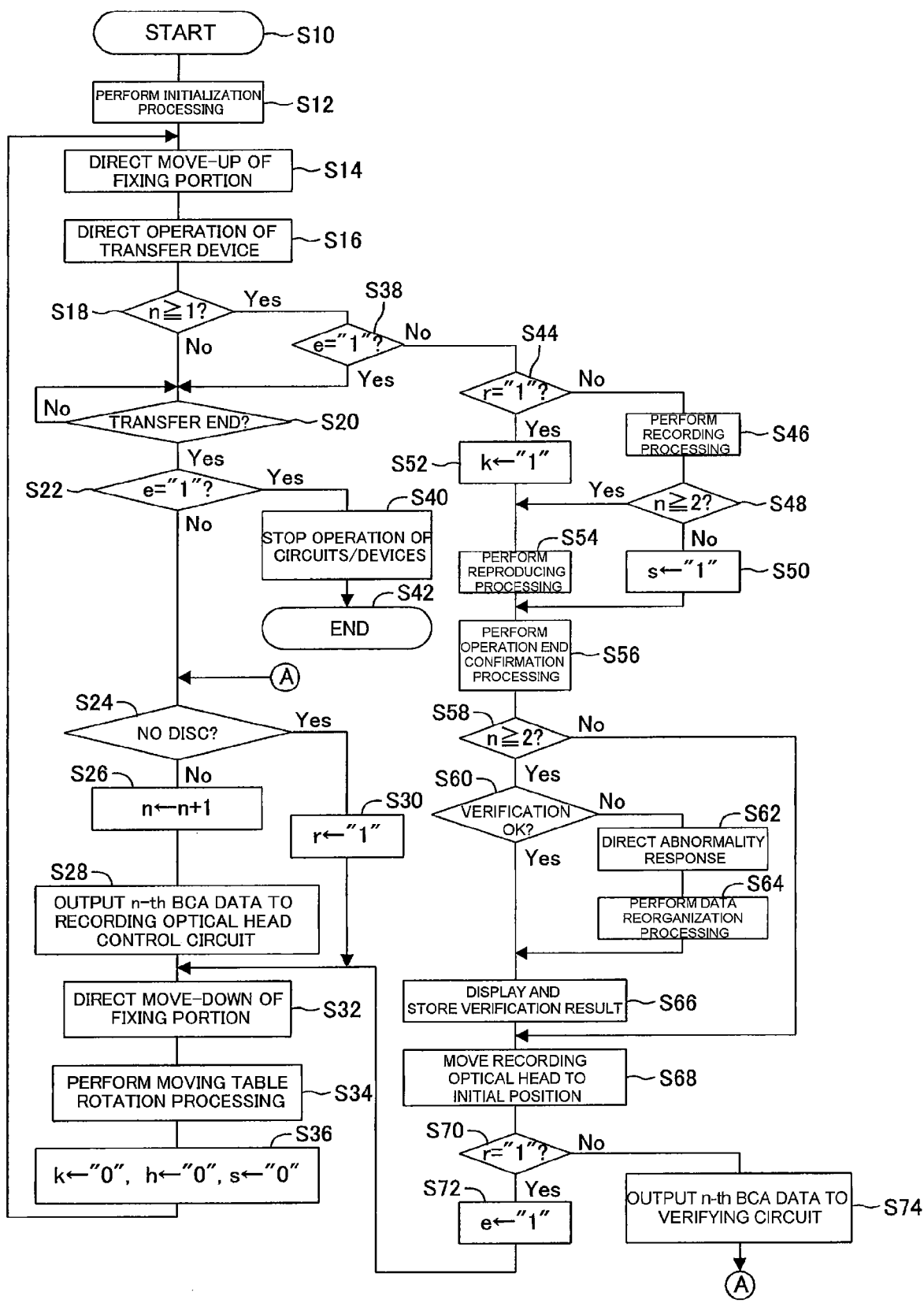
FIG. 5 is a flowchart showing a main program executed by a controller of a BCA recording and reproducing apparatus according to an embodiment.
Figure 6:
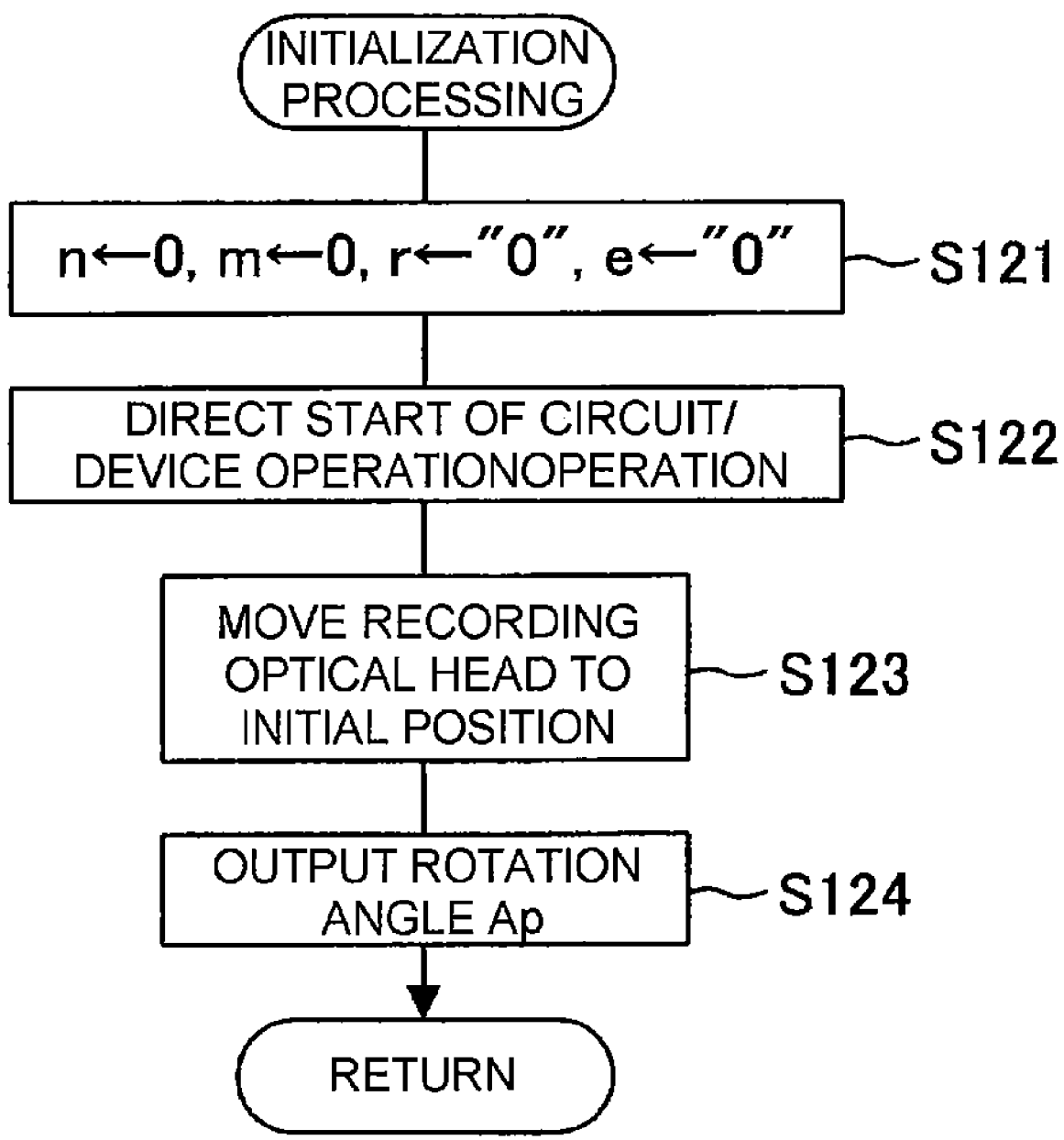
FIG. 6 is a flowchart showing a sub program for performing initialization processing.

When the operation start direction is input through the input device 62, the controller 60 executes the main program shown in FIG. 5. The program starts with the step S10 (which is hereinafter referred to simply as "S10", and this is the same for the other steps), and the initialization processing is performed in S12. The initialization processing is performed by executing the sub program shown in FIG. 6. Specifically, in the initialization processing, the controller 60 initializes a data number counter n, a rotation angle counter m, a stock end flag r and an operation stop flag e (n→0, m→0, r="0", e="0") (S121). The data number counter n indicates the sequence number of BCA data to be recorded on an optical disc or the sequence number of recorded BCA data, which indicates the order corresponding to the BCA data that is stored in the memory 60a. The data number counter n is 1 for the BCA data to be recorded first, and it counts up one by one each time recording is performed. If n is 0, it indicates that there is no optical disc on which BCA data is to be recorded. The rotation angle counter m is a value indicating the rotation angle of the optical disc moving table 41. The value of m changes in the order of 0→1→2. The controller 60 stores an initial angle Ap of the optical disc moving table 41. The initial angle Ap is the rotation angle of the optical disc moving table 41 where each of the three holes 41a of the optical disc moving table 41 is located opposite to each working table.

The stock end flag r indicates the presence or absence of an optical disc in the stock storage position. If there is an optical disc in the stock storage position, the stock end flag r is set to "0", and if there is no optical disc, the stock end flag r is set to "1". The operation stop flag e indicates the presence or absence of an optical disc on which BCA data is to be recorded or an optical disc whose recorded BCA data is to be reproduced. If there is such an optical disc, the operation stop flag e is set to "0", and if there is no such an optical disc, that is, when recording and reproduction of data end in all optical discs, the operation stop flag e is set to "1".

The controller 60 outputs a direction to start operation to each circuit and device (S122) and outputs a direction to move the recording optical head 21 to the initial position to the feed control circuit 104 (S123). The feed control circuit 104 thereby controls the driving of the feed motor 23b in such a way that the recording laser beam that is emitted from the recording optical head 21 is irradiated onto a prescribed position (innermost peripheral position) of the BCA of the optical disc which is placed on the recording turntable 11.

After that, the controller 60 outputs the rotation angle Ap to the moving table rotation control circuit 108 (S124). The moving table rotation control circuit 108 then controls the driving of the moving table rotating motor 42 in such a way that the rotation angle of the optical disc moving table 41 becomes the rotation angle Ap. The optical disc moving table 41 thereby rotates to the position where the center of each of the three holes 41*a* corresponds to the central axis of each working table. As a result, each hole 41*a* is located above each working table. The process then ends the sub program and returns to the main program.

After performing the above-described initialization processing in S12, the controller 60 proceeds to S14 and outputs the up direction to the up/down control circuit 109. In response to the input up direction, the up/down control circuit 109 applies power to the magnetic solenoid of the up/down portion 52. By the power application, the magnetic solenoid generates an attaching force, and the fixing portion 51 moves up by the attaching force. As the fixing portion 51 moves up, the recording turntable 11, the reproducing turntable 12 and the exchanging table 13 move up along the axial direction of an optical disc which is to be placed in the hole 41*a*. The recording turntable 11, the reproducing turntable 12 and the exchanging table 13 thereby project upward from the holes 41*a* which are located above the tables (first operation).

The controller 60 then proceeds to S16 and outputs a transfer direction to the transfer control device 110. In response to the transfer direction, the transfer control device 110 controls the driving of the optical disc exchanging device 30. The optical disc exchanging device 30 thereby grasps an optical disc in the stock storage position and moves the grasped optical disc to the position above the exchanging table 13. The optical disc exchanging device 30 then releases the grasp of the optical disc at that position. The optical disc is thereby placed on the exchanging table 13. After this operation ends, the transfer control device 110 outputs a transfer end signal to the controller 60.

After outputting the transfer direction to the transfer control device 110, the controller 60 proceeds to S118 and determines whether the data number counter n is equal to or larger than 1 (i.e. whether n is not 0). Because n is set to 0 in the initialization processing of S12 immediately after starting the execution of the program, the determination result is No. If the determination result is No, the controller 60 proceeds to S20. In S20, the controller 60 determines whether the exchange of an optical disc by the optical disc exchanging device 30 ends, that is, whether the transfer end signal is input from the transfer control device 110. If there is no input of the transfer end signal (No in S20), the controller 60 waits for the input of the transfer end signal. If there is an input of the transfer end signal, the controller 60 proceeds to S22.

In S22, the controller 60 determines whether the operation stop flag e is set to "1". Because the operation stop flag e is set to "0" in the initialization processing of S12 immediately after starting the execution of the program, the determination in S22 is No. If the determination in S22 is No, the controller 60 proceeds to the subsequent step S24. In S24, the controller 60 determines whether there is any optical disc to be transferred by the optical disc exchanging device 30, that is, whether there is any stock of an optical disc in the stock storage position. Specifically, it determines whether a stock end signal is input from the grasping portion 31 of the optical disc exchanging device 30. If there is an optical disc to be transferred (No in S24), the controller 60 proceeds to S26 and increments the data number counter n. Because the data number counter n is set to 0 in the initialization processing of S12 immediately after starting the execution of the program, the data number counter n is set to 1 as a result of the execution of the processing of S26. Hereinafter, n stays 1 until n is incremented in S26. After setting n to 1 in S26, the controller 60 proceeds to S28 and outputs the BCA data which is stored in the memory 60*a* to the recording optical head control circuit 103 in accordance with a prescribed sequence (data output unit). The prescribed sequence is the sequence which is predetermined by the data number counter n when data reorganization, which is described later, is not yet performed. Thus, the data which is output at this time is the BCA data with the data number counter of n-th, which is the first. After that, the controller 60 proceeds to S32. If the determination in S24 is Yes, that is, when there is no optical disc to be transferred, the controller 60 proceeds from S24 to S30 and sets "1" to the stock end flag r and further proceeds to S32.

In S32, the controller 60 outputs the down direction to the up/down control circuit 109. In response to the input down direction, the up/down control circuit 109 stops the application of power to the magnetic solenoid of the up/down portion 52. By the stop of power application, the attaching force which is generated by the magnetic solenoid disappears, and the fixing portion 51 thereby moves down. As the fixing portion 51 moves down, the recording turntable 11, the reproducing turntable 12 and the exchanging table 13 move down along the axial direction of an optical disc which is placed in the hole 41*a*. The tables thereby operate to be buried in the holes 41*a* (second operation), and consequently they are located below the optical disc moving table 41. Because an optical disc is placed on the exchanging table 13, the optical disc which is placed is delivered from the exchanging table 13 to the hole 41*a* which is located therebelow when the exchanging table 13 moves down.

Figure 7:
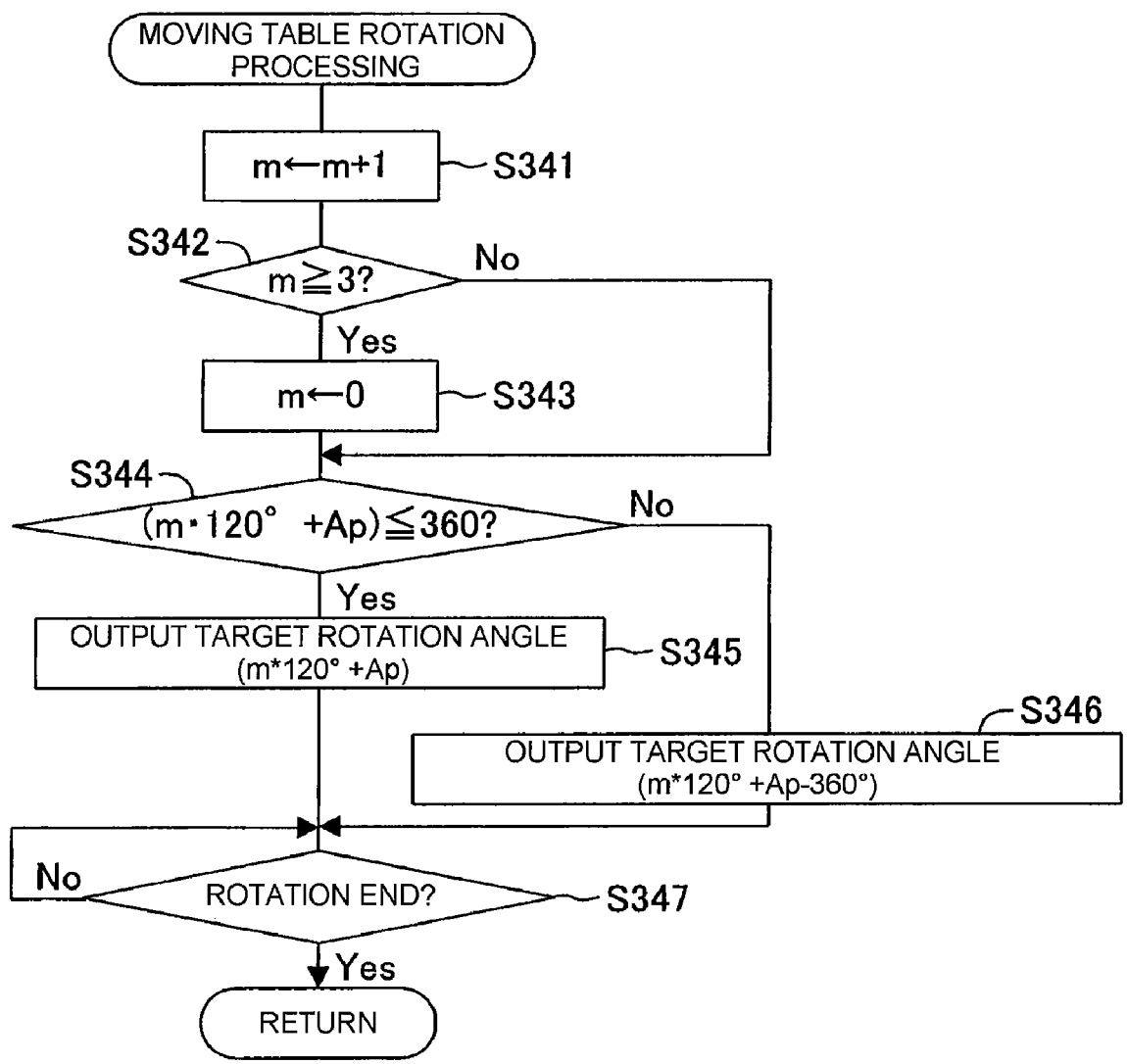
FIG. 7 is a flowchart showing a sub program for performing optical disc moving table rotation processing.

The process then proceeds to S34 and the controller 60 performs the moving table rotation processing in S34. The moving table rotation processing is performed by executing the sub program shown in FIG. 7. Specifically, in the execution of the moving table rotation processing, the controller 60 firstly increments the rotation angle counter m in S341 of FIG. 7. It is then determined whether the rotation angle counter m is equal to or larger than 3 in S342. If m is less than 3 (No in S342), the controller 60 proceeds to S344. If m is equal to or larger than 3 (Yes in S342), the controller 60 proceeds to S343, initializes m (m=0) in S343 and further proceeds to S344. By the processing of S341, S342 and S343, the rotation angle counter m repeats the values of 0, 1 and 2, in the sequence of 0, 1, 2, 0, 1, 2 . . . .

In S344, the controller 60 determines whether an angle that is the sum of the initial angle Ap and the product of 120° by the rotation angle counter m is equal to or smaller than 360°. If the determination result is Yes, the controller 60 proceeds to S345. In S345, the controller 60 outputs an angle (m*120°+Ap) that is the sum of the initial angle Ap and the product of 120° by the rotation angle counter m as a rotation angle to the moving table rotation control circuit 108. On the other hand, if the determination result in S344 is No, the controller 60 proceeds to S346. In S346, the controller 60 outputs an angle (m*120°+Ap−360°) that is a result of subtracting 360° from the sum of the initial angle Ap and the product of 120° by the rotation angle counter m as a rotation angle to the moving table rotation control circuit 108.

By the execution of the processing in S345 or S346, the moving table rotation control circuit 108 controls the driving of the moving table rotating motor 42 in such a way that the rotation angle of the optical disc moving table 41 becomes the angle which is input from the controller 60. The optical disc moving table 41 thereby rotates from the current angle (angle Ap) to the angle that adds the product of 120° by m to the angle Ap. Therefore, each time m is incremented, the optical disc moving table 41 rotates by 120° in the same direction. By this rotation, the hole 41a which has been located above the exchanging table 13 before the rotation is located above the recording turntable 11 after the rotation, the hole 41a which has been located above the recording turntable 11 before the rotation is located above the reproducing turntable 12 after the rotation, and the hole 41a which has been located above the reproducing turntable 12 before the rotation is located above the exchanging table 13 after the rotation. In this manner, the correspondence between each working table and each hole 41a shifts sequentially. Because an optical disc is set to the hole 41a which has been located above the exchanging table 13 before the rotation, the optical disc is located above the recording turntable 11 after the rotation.

After executing the processing in S345 or S346, the controller 60 proceeds to S347 and determines whether the rotation of the optical disc moving table 41 ends. Specifically, the controller 60 determines whether there is the input of the rotation end signal from the moving table rotation control circuit 108. If there is no input of the rotation end signal from the moving table rotation control circuit 108 (No in S347), the controller 60 waits for the input of the rotation end signal. If there is an input of the rotation end signal (Yes in S347), the process ends the sub program and returns to the main program.

After performing the moving table rotation processing in S34, the controller 60 proceeds to S36 and sets a recording end flag k, an exchange end flag h and a reproduction end flag s to "0". The recording end flag k indicates whether recording of BCA data onto an optical disc by the irradiation of the recording laser beam from the recording optical head 21 ends, and "0" indicates that the recording does not end and "1" indicates that the recording ends. The exchange end flag h indicates whether operation (optical disc exchanging operation) that the optical disc exchanging device 30 ejects the optical disc on the exchanging table 13 and places a new optical disc on the exchanging table 13 ends, and "0" indicates that the exchange does not end and "1" indicates that the exchange ends. The reproduction end flag s indicates whether reproduction of BCA data recorded on an optical disc by the irradiation of the reproducing laser beam from the reproducing optical head 26 and the detection of the reflected light ends, and "0" indicates that the reproduction does not end and "1" indicates that the reproduction ends.

After executing the processing of S36, the controller 60 returns to S14 and again outputs the up direction to the up/down control circuit 109. The fixing portion 51 thereby moves up, and the recording turntable 11, the reproducing turntable 12 and the exchanging table 13 move up accordingly. Because an optical disc is placed in the hole 41a which is located above the recording turntable 11 as described above, the recording turntable 11 receives the optical disc from the hole 41a when it moves up. The optical disc is thereby placed on the recording turntable 11.

Then, the controller 60 outputs a transfer direction to the transfer control device 110 in S16. A new optical disc is thereby placed on the exchanging table 13. After outputting the transfer direction, the controller 60 proceeds to S18 and determines whether the data number counter n is equal to or larger than 1 (i.e. whether n is not 0). If n is incremented at least once in S26, n is equal to or larger than 1. Because n is 1 at this time, the determination results in Yes. If the determination is Yes, the controller 60 proceeds to S38. In S38, the controller 60 determines whether the operation stop flag e is "1".

Figure 8:
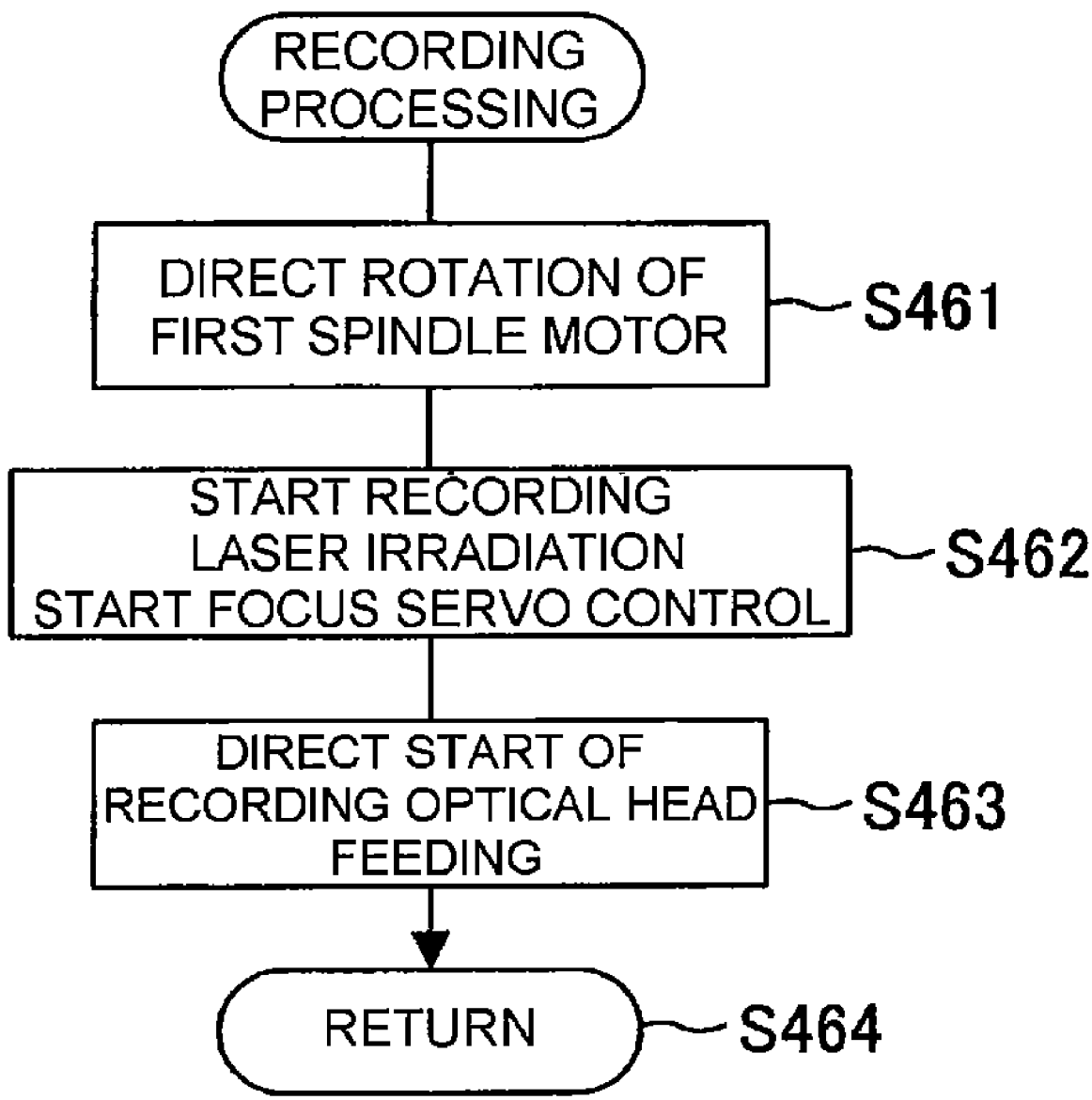
FIG. 8 is a flowchart showing a sub program for performing recording processing.

Because this is immediately after the apparatus starts operating, the operation stop flag e is "0", and thus the determination result in S38 is No, and therefore the controller 60 proceeds to S44. In S44, the controller 60 determines whether the stock end flag r is "1". The stock end flag r stays "0" unless the determination result in S24 becomes Yes and the controller 60 proceeds to S30. Thus, the determination result is No in this case and the controller 60 proceeds to S46. In S46, the recording processing is performed. The recording processing is performed by executing the sub program shown in FIG. 8. Specifically, in the execution of the recording processing, the controller 60 first outputs a rotation drive direction to the first spindle motor control circuit 101 in S461 of FIG. 8. The first spindle motor control circuit 101 thereby rotates the first spindle motor 22. By the rotation of the first spindle motor 22, the recording turntable 11 and the optical disc which is set thereto rotate at a prescribed rotation speed.

The controller 60 then proceeds to S462 and outputs a recording laser irradiation start direction and a focus servo control direction to the recording optical head control circuit 103. The recording optical head control circuit 103 thereby controls the emission state of the recording laser light which is emitted from the recording optical head 21 and performs the focus servo control. Then, the controller 60 proceeds to S463 and outputs a drive direction to the feed control circuit 104. In response to the drive direction, the feed control circuit 104 controls the driving of the feed motor 23b. By the drive control of the feed motor 23b, the recording optical head 21 is controlled to move in the radial direction of the optical disc which is placed on the recording turntable 11. By the control of the emission state of the recording laser beam and the movement control of the recording optical head 21, the n-th (first) BCA data which is input to the recording optical head control circuit 103 in S28 is recorded on the BCA of the optical disc which is placed on the recording turntable 11. After that, the process ends the sub program and returns to the main program.

After starting the recording processing in S46, the controller 60 proceeds to S48 and determines whether the data number counter n is equal to or larger than 2. Because n is 1 at this time, the determination result is No and it proceeds to S50. In S50, the reproduction end flag s is set to "1". The case where the determination in S48 results in No is when n is 1. The case where n is 1 is the state where an optical disc is set to the recording turntable 11 but an optical disc is not set to the reproducing turntable 12. In this case, the reproduction end flag s is set to "1", so that the reproduction of an optical disc is assumed to end.

Figure 10:
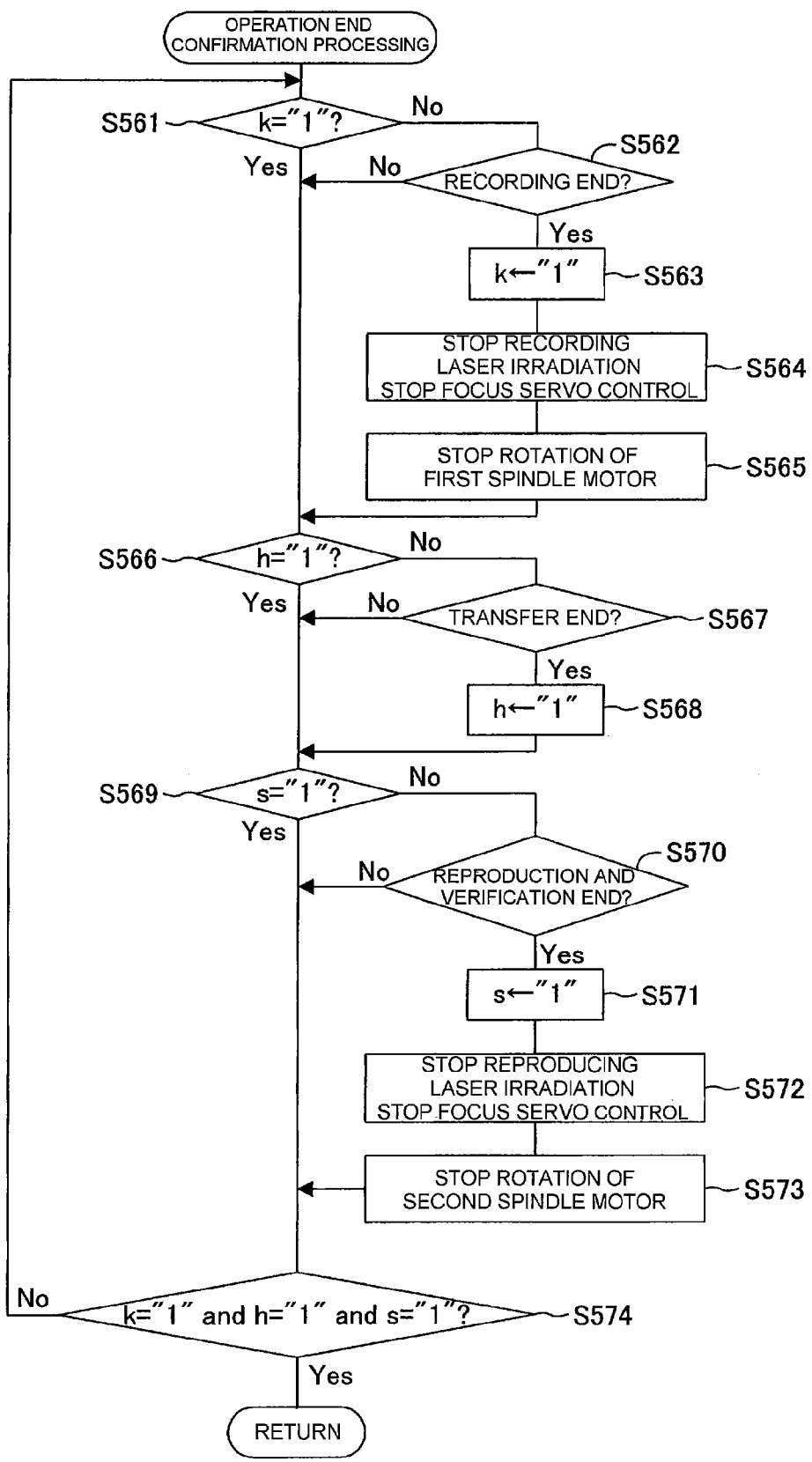
FIG. 10 is a flowchart showing a sub program for performing operation end confirmation processing.

The controller 60 then proceeds to S56 and performs operation end confirmation processing in S56. The operation end confirmation processing is performed by executing the sub program shown in FIG. 10. Specifically, in the execution of the operation end confirmation processing, the controller 60 first determines whether the recording end flag k is "1" in S561 of FIG. 10. If k is "1", it proceeds to S566. If k is not "1", it proceeds to S562. In S562, the controller 60 determines whether the position of the recording optical head 21 in the radial direction of the optical disc on which BCA data is recorded is at the end position. This is determined based on a moving amount which is calculated from a count number of the pulse signal that is output from an encoder of the feed motor 23b. If the position of the recording optical head 21 is not at the end position (No in S562), the controller 60 proceeds to S566. If it is at the end position (Yes in 562), which is when the recording of BCA data ends, the controller 60 proceeds to S563 and sets the recording end flag k to "1". After that, the controller 60 proceeds to S564 and outputs a recording laser irradiation stop direction and a focus servo control stop direction to the recording optical head control circuit 103. The emission of the recording laser beam from the recording optical head 21 thereby stops. The controller 60 then proceeds to S565 and outputs a rotation stop direction to the first spindle motor control circuit 101. The rotation of the recording turntable 11 thereby stops. The controller 60 then proceeds to S566.

In S566, the controller 60 determines whether the exchange end flag h is "1". If the determination result is Yes, it proceeds to S569. If the determination result is No, it proceeds to S567. In S567, the controller 60 determines whether the exchange of an optical disc by the optical disc exchanging device 30 ends, that is, whether an exchange end signal is input from the transfer control device 110. If the determination result is No, it proceeds to S569. If the determination result is Yes, which is when the exchange of an optical disc ends, it proceeds to S568. Then, the controller 60 sets the exchange end flag h to "1". After that, it proceeds to S569.

In S569, the controller 60 determines whether the reproduction end flag s is "1". Because s is set to "1" in S50, the determination result is Yes at this time. If the determination result is Yes, the controller 60 proceeds to S574. If the reproduction end flag s is "0", it proceeds to S570 and determines whether the reproduction of data and the verification with recording data end. If the reproduction and the verification do not end yet, it proceeds to S574. If the reproduction and the verification end, it proceeds to S571 and sets "1" is to the reproduction end flag s, and then outputs a reproducing laser irradiation stop direction and a focus servo stop direction in S572. After that, the controller 60 outputs a direction to stop the first spindle motor 22 in S573. It then proceeds to S574.

In S574, the controller 60 determines whether the values of the recording end flag k, the exchange end flag h and the reproduction end flag s are all set to 1. In other words, it determines whether all of the processing (recording processing, reproduction processing and exchange processing) which are performed in each table (the recording turntable 11, the reproducing turntable 12 and the exchanging table 13) end. If the determination result is No, the controller 60 returns to S561 and again determines whether recording, exchange and reproduction end. If the determination result is Yes, the process ends the sub program and returns to the main program. Unless the determination result in S574 results in Yes, that is, unless all of the recording processing performed on the recording turntable 11, the reproduction processing performed on the reproducing turntable 12 and the optical disc exchange processing performed on the exchanging table 13 end, the operation end confirmation processing is performed repeatedly.

After executing the above-described operation end confirmation processing in S56, the controller 60 proceeds to S58 and determines whether n is equal to or larger than 2. Because n is 1, the determination result is No and the controller 60 proceeds to S68. In S68, the controller 60 outputs a direction to the feed control circuit 104 so as to move the recording optical head 21 to the initial position. The recording optical head 21 thereby returns to the initial position (the innermost peripheral position of the BCA, which is the start position of recording laser irradiation).

The controller 60 then proceeds to S70 and determines whether the stock end flag r is set to "1". If the determination result is Yes, that is when the controller 60 receives the stock end signal, it proceeds to S72. On the other hand, if the determination result is No, the controller 60 proceeds to S74 and outputs the n-th BCA data to the verifying circuit 106. Because n is 1 at this time, the controller 60 outputs the first BCA data to the verifying circuit 106. The controller 60 then returns to S24.

The controller 60 returns to S24 and determines whether there is a new optical disc to be exchanged, that is, whether the stock end signal is input from the grasping portion 31 of the optical disc exchanging device 30. If there is a new disc (No in S24), the controller 60 proceeds to S26 and increments n. Because n has been 1, n becomes 2 by the execution of this processing.

The controller 60 then proceeds to S28 and outputs the n-th (second) BCA data to the recording optical head control circuit 103. It then proceeds to S32 and outputs the down direction to the up/down control circuit 109. The fixing portion 51 thereby moves down, and the recording turntable 11, the reproducing turntable 12 and the exchanging table 13 also move down. By the move-down of those tables, each working table is buried in the hole 41a to be located lower than the optical disc moving table 41. Because optical discs are placed on the exchanging table 13 and the recording turntable 11, the optical discs are delivered from the tables 11 and 13 to the opposite holes 41a when the exchanging table 13 and the recording turntable 11 move down.

After that, the controller 60 proceeds to S34 and rotates the optical disc moving table 41 by 120°. By the rotation, the hole 41a which has been located above the exchanging table 13 before the rotation is located above the recording turntable 11 after the rotation, the hole 41a which has been located above the recording turntable 11 before the rotation is located above the reproducing turntable 12 after the rotation, and the hole 41a which has been located above the reproducing turntable 12 before the rotation is located above the exchanging table 13 after the rotation. Accordingly, the optical disc that is placed in the hole 41a which has been located above the exchanging table 13 before the rotation is located above the recording turntable 11 after the rotation, and the optical disc that is placed in the hole 41a which has been located above the recording turntable 11 before the rotation is located above the reproducing turntable 12 after the rotation. If n is 3 or larger, an optical disc is placed also in the hole 41a which has been located above the reproducing turntable 12 before the rotation. Thus, the optical disc is placed above the exchanging table 13 after the rotation.

The controller 60 then proceeds to S36 and sets the recording end flag k, the exchange end flag h and the reproduction end flag s to "0". After that, the controller 60 returns to S14 and outputs the up direction to the up/down control circuit 109. The fixing portion 51 thereby moves up, and the recording turntable 11, the reproducing turntable 12 and the exchanging table 13 also move up accordingly. Because the optical discs are placed in the hole 41a which is located above the recording turntable 11 and the hole 41a which is located above the reproducing turntable 12 as described above, the recording turntable 11 and the reproducing turntable 12 receive the optical discs from the corresponding holes 41a when they move up. The optical discs are thereby placed on the recording turntable 11 and the reproducing turntable 12. If n is 3 or larger, an optical disc is also placed in the hole 41a which is located above the exchanging table 13, and the exchanging table 13 receives the optical disc from the corresponding hole 41a when it moves up, and thereby the optical disc is placed also on the exchanging table 13.

After that, the controller 60 outputs a transfer direction to the transfer control device 110 in S16. A new optical disc is thereby placed on the exchanging table 13. Because the optical discs are set to the recording turntable 11 and the reproducing turntable 12 as described above, by the setting of the optical disc onto the exchanging table 13, the optical discs are set to all the tables. Because the optical disc is placed on the exchanging table 13 as well when n is equal to or larger than 3, the optical disc exchanging device 30 ejects the optical disc which is placed on the exchanging table 13 according to the direction of S16 and then places a new optical disc on the exchanging table 13.

After outputting the transfer direction, the controller 60 proceeds to S18 and determines whether the data number counter n is equal to or larger than 1 (i.e. whether n is not 0). Because n is 2 at this time, the determination results in Yes. If the determination is Yes, the controller 60 proceeds to S38. In S38, the controller 60 determines whether the operation stop flag e is "1".

Because it is immediately after the apparatus starts operating, the operation stop flag e is "0", and thus the determination result in S38 is No and the controller 60 proceeds to S44. In S44, the controller 60 determines whether the stock end flag r is "1". If there is the stock of an optical disc (when the stock end signal is not input), the determination result is No, and the controller 60 proceeds to S46 to perform the recording processing. The n-th (second) BCA data is thereby recorded on the BCA of the optical disc which is set to the recording turntable 11. The controller 60 then proceeds to S48 and determines whether the data number counter n is equal to or larger than 2. Because n is 2, the determination result is Yes and the controller 60 proceeds to S54.

Figure 9:
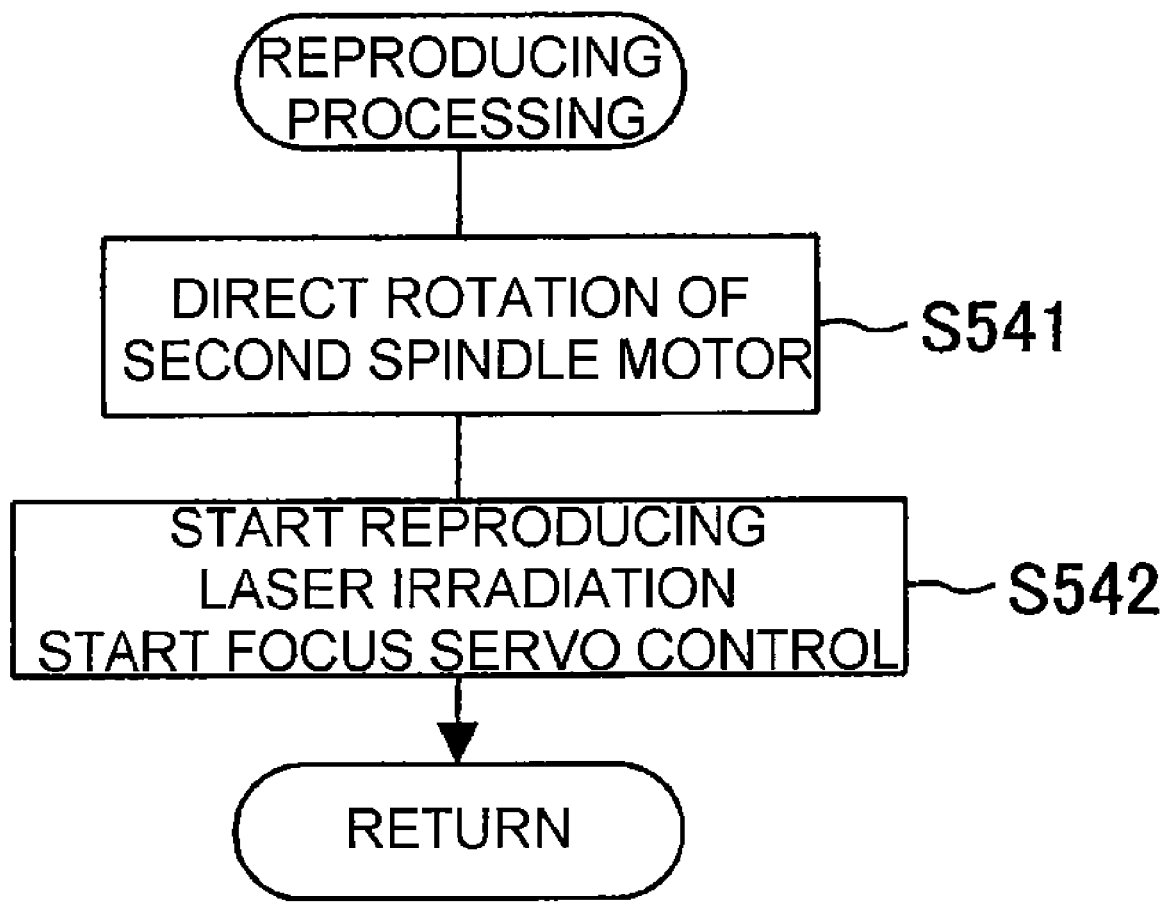
FIG. 9 is a flowchart showing a sub program for performing reproduction processing.

In S54, the controller 60 performs the reproduction processing. The reproduction processing is performed by executing the sub program shown in FIG. 9. In the execution of the reproduction processing, the controller 60 first outputs a rotation drive direction to the second spindle motor control circuit 102 in S541 of FIG. 9. The second spindle motor control circuit 102 thereby rotates the second spindle motor 27. By the rotation of the second spindle motor 27, the reproducing turntable 12 and the optical disc which is placed thereon rotate at a prescribed rotation speed. The controller 60 then proceeds to S542 and outputs a reproducing laser irradiation start direction and a focus servo direction to the reproducing optical head control circuit 105. The reproducing optical head control circuit 105 thereby controls the emission state of the reproducing laser beam which is emitted from the reproducing optical head 26 and performs the focus servo control. Further, the reproducing optical head 26 receives the reflected light of the reproducing laser beam which is irradiated onto the BCA of the optical disc which is placed on the reproducing turntable 12. A reproduced signal is generated from the received light and decoded. The decoded reproduced data (BCA data) is input to the verifying circuit 106. The verifying circuit 106 verifies the input reproduced data against the recording data (the recording data corresponding to the reproduced data) which is input in S74. After the processing in S542, the process ends the sub program and returns to the main program.

After starting the reproduction processing in S54, the controller 60 performs the operation end confirmation processing in S56. After confirming that all of the processing (the recording processing, the reproduction processing and the exchange processing) end in S56, the controller 60 proceeds to S58. In S58, the controller 60 determines whether n is equal to or larger than 2. Because n is 2, the determination result is Yes and the controller 60 proceeds to S60. In S60, the controller 60 determines whether the verification result between the recording data and the reproduced data which is performed in the verifying circuit 106 is suitable, that is, whether recording of the BCA data onto an optical disc is properly performed (verifying unit, verifying process). In the case where the n-th recording data is recorded on the optical disc in the recording processing of S46, the reproduction of the optical disc on which the previous, i.e. the (n−1)th, recording data is recorded is performed in the reproduction processing of S54. Thus, in the verification determination in S60, the reproduced data is verified against the (n−1)th recording data, which is the first recording data in this case. If the determination result is Yes, that is when the reproduced data and the recording data match, the controller 60 proceeds to S66 and displays the verification result (the result indicating verification OK) on the display device 61 and stores the result.

Figure 11:
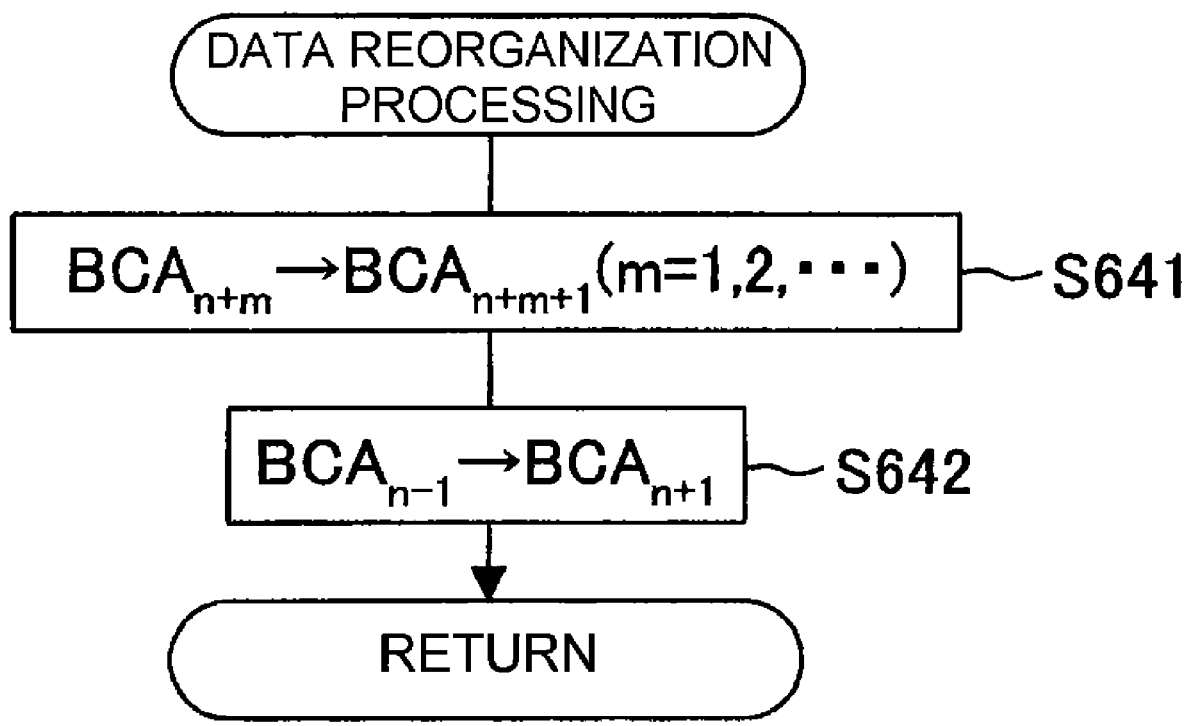
FIG. 11 is a flowchart showing a sub program for performing data reorganization processing.

On the other hand, if the determination result is No, that is, when the reproduced data and the recording data do not match, it means that the BCA data is not properly recorded on the optical disc. Thus, in this case (No in S60), the controller 60 proceeds to S62 and outputs an abnormality response direction to the transfer control device 110. In response to the abnormality response direction, the transfer control device 110 transfers the optical disc on which BCA data recording is not properly performed to a disposal position in the next optical disc exchange processing. After that, the controller 60 proceeds to S64 and performs reorganization of BCA data (data sequence reorganizing unit). The BCA data reorganization processing is performed by executing the sub program in FIG. 11. Specifically, in the execution of the BCA data reorganization processing, the controller 60 changes the order of a plurality of pieces of BCA data which are currently stored in the memory 60a by bringing down the (n+m)th (m=1, 2, 3, . . . ) BCA data $BCA_{n+m}$ into the (n+m+1)th (m=1, 2, 3, . . . ) BCA data $BCA_{n+m+1}$ in S641 of FIG. 11. The third BCA data thereby becomes the fourth data, and the fourth BCA data becomes the fifth data. Next, in S642, the controller 60 makes change so that the (n−1)th (which is the first in this case) BCA data $BCA_{n-1}$, which is the data recorded on the optical disc to be discarded, becomes the (n+1)th (the third in this case) BCA data $BCA_{n+1}$, which is the data to be output next. After the processing of S642, the process ends the sub program and returns to the main program. As a result of such data reorganization processing, the sequence of the BCA data which have been arranged in the order of n−1, n, n+1, n+2, . . . is changed into the order of n, n−1, n+1, n+2, . . . (the n-th data is the data which is recorded on the optical disc that is currently placed on the recording turntable 11). After that, the controller 60 proceeds to S66 of the main program and displays the verification result (the result indicating verification NG) using the display device 61 and stores the result.

Then, the controller 60 proceeds to S68 and moves the recording optical head 21 to the initial position and further determines whether the stock end flag r is "1" in S70. If the determination result is Yes, the controller 60 proceeds to S72. On the other hand, if the determination result is No, the controller 60 proceeds to S74 and outputs the n-th BCA data to the verifying circuit 106. Because n is 2 at this time, the controller 60 outputs the second BCA data to the verifying circuit 106. It then returns to S24.

After that, each time n is incremented in S26, the above-described processing where n is 2 is executed repeatedly. Accordingly, each time the optical disc moving table 41 rotates by 120°, the recording of BCA data onto the optical disc which is placed on the recording turntable 11, the reproduction of the BCA data on the optical disc which is placed on the reproducing turntable 12, the ejection of the optical disc from the exchanging table 13 and the placement of a new optical disc are performed in parallel. There is thus no time loss because the processing is performed in parallel not only during the recording of BCA data but also during the ejection and placement of an optical disc and the reproduction of BCA data. It is thereby possible to record and reproduce BCA data in a short time.

If a new optical disc runs out, the stock end signal is input to the controller 60 from the optical disc exchanging device 30. In such a case, the determination result of S24 is Yes, and the controller 60 proceeds to S30 and sets the stock end flag r to "1". After that, by the execution of the processing of S32 and S34, an optical disc is delivered to the optical disc moving table 41 and the optical disc moving table 41 rotates by 120°. Further, by the execution of the processing of S36, each end flag is set to "0". After that, the process returns to S14, and by the execution of the processing of S14, the optical disc is delivered to each working table from the optical disc moving table 41. Because there is no new optical disc, an optical disc is not placed on the recording turntable 11. After that, the controller 60 proceeds to S38 and S44, and the determination result in S44 is Yes and it further proceeds to S52. In S52, the controller 60 sets the recording end flag k to "1". It is thereby assumed that the recording has ended.

After that, the reproduction processing is performed in S54 and then the verification determination is performed in S60 after going through S56 and S58. If the determination result of S60 is Yes, the controller 60 proceeds to S66 and, if it is No, it goes through S62 and S66 and then proceeds to S66. In S66, the verification result is displayed and stored, and the recording optical head 21 is moved to the initial position in S68. After that, the controller 60 proceeds to S70 and again determines whether the stock end flag r is "1". Because the determination result is Yes at this time, the controller 60 proceeds to S72 and sets the operation stop flag e to "1". After that, the controller 60 proceeds to S32. By the execution of the processing of S32 to S34, an optical disc is delivered to the optical disc moving table 41 and the optical disc moving table 41 rotates by 120°. Further, by the execution of the processing of S36, the end flags k, h and s are set to "0". It then returns to S14 and, by the execution of the processing of S14, the optical disc is delivered form the optical disc moving table 41 to the working table. The optical disc is placed only on the exchanging table 13 at this time. Then, the optical disc exchanging device 30 operates by S16 and ejects the optical disc which is placed on the exchanging table 13. After that, the controller 60 proceeds to S38 through S18. The determination of S38 is Yes and it thereby proceeds to S20. In the determination of S20, the controller 60 waits for the end of optical disc exchange by the optical disc exchanging device 30 and then proceeds to S22. In S22, the controller 60 determines whether the operation stop flag e is "1". The determination result is Yes, and thereby the controller 60 proceeds to S40. Then, the operation of each circuit and device stops in S40 and the execution of the program ends in S42.

As described earlier, in the BCA data reorganization in S64, the recording sequence of BCA data is changed from the order of n−1, n, n+1, n+2, . . . into the order of n, n−1, n+1, n+2, . . . . Specifically, the BCA data is rearranged in such a way that the BCA data (the (n−1)th data) whose BCA data verification result is not OK is inserted immediately after the currently recorded BCA data (the n-th data), and the order of the BCA data which are subsequent to the currently recorded BCA data is brought down one by one. Therefore, the sequential order of optical discs and the numerical order of BCA data are reverse between the optical disc on which the inserted BCA data is recorded and the optical disc on which the previous BCA data is recorded. In order to change the sequence back to its original order so that the sequential order of optical discs and the numerical order of BCA data correspond to each other, the transfer control device 110 executes the main program shown in FIG. 12.

Figure 12:
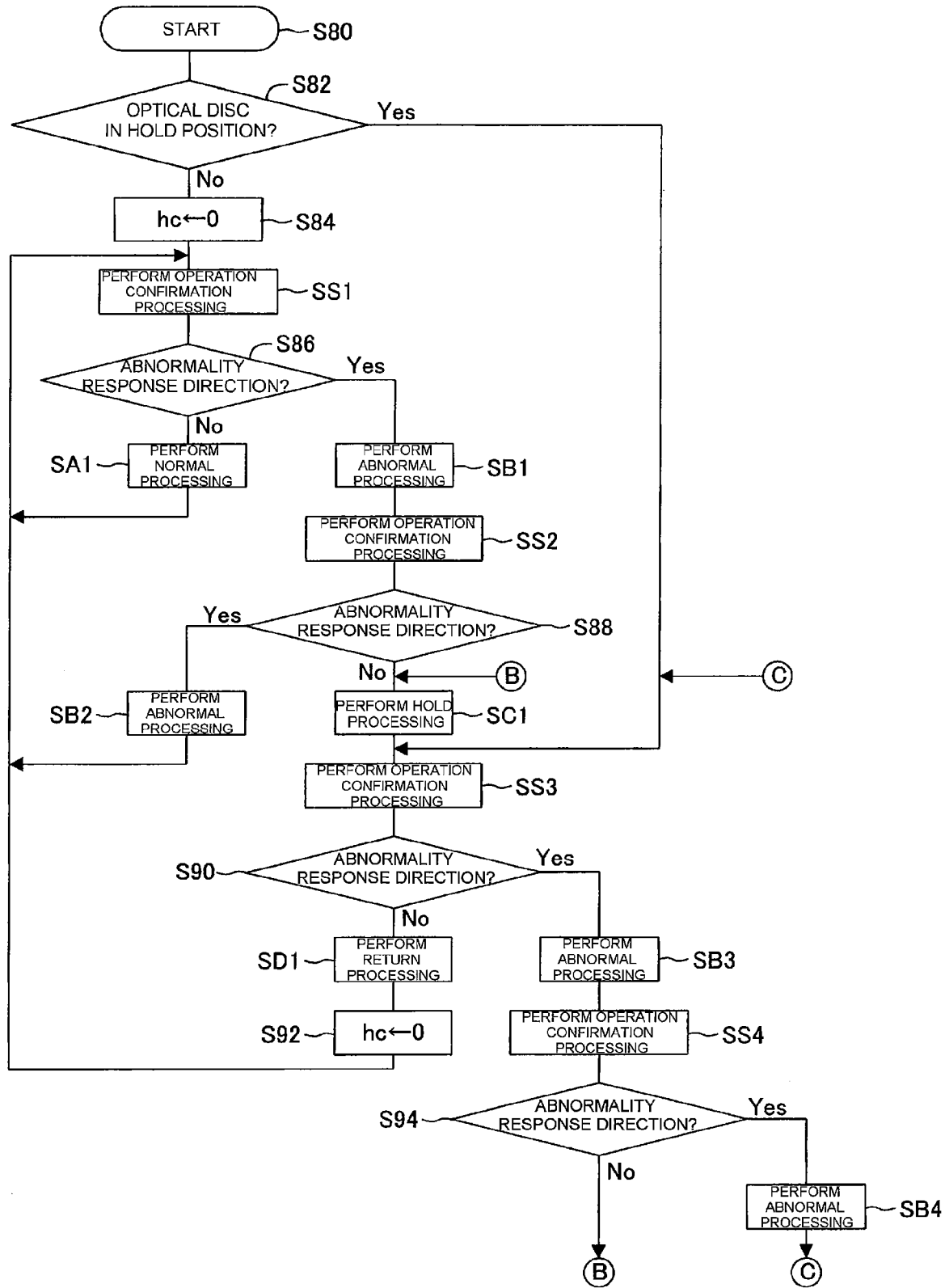
FIG. 12 is a flowchart showing a main program executed by a transfer control device of a BCA recording and reproducing apparatus according to an embodiment.
Figure 13:
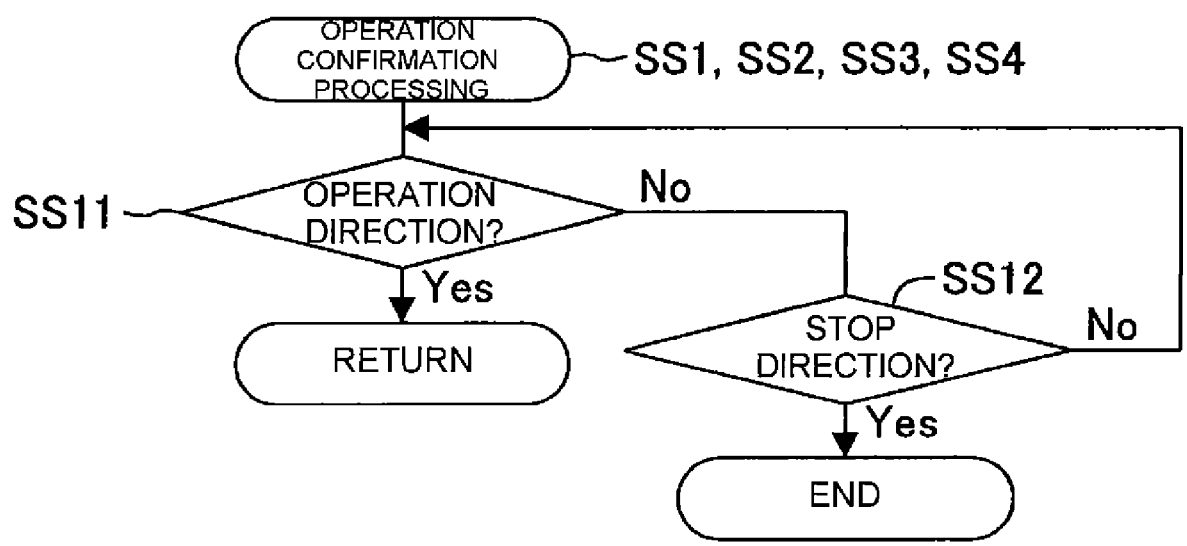
FIG. 13 is a flowchart showing a sub program for performing operation confirmation processing.

In the main program of FIG. 12, when an operation direction is input to the transfer control device 110 from the controller 60, the transfer control device 110 starts operating in S80. Then, in S82, the transfer control device 110 determines whether there is an optical disc in the hold position. The determination is performed by determining whether a hold counter hc, which is described later, has a value different from 0. If there is an optical disc in the hold position (Yes in S82), the transfer control device 110 proceeds to SS3. If, on the other hand, there is no optical disc in the hold position (No in S82), the transfer control device 110 proceeds to S84 and initializes the hold counter hc (hc=0). The transfer control device 110 then proceeds to SS1 and executes operation confirmation processing. The operation confirmation processing is performed by executing the sub program shown in FIG. 13. Specifically, in the execution of the operation confirmation processing, the transfer control device 110 determines whether there is an input of an operation direction in SS11 of FIG. 13. This is determined based on whether the controller 60 outputs the operation direction to the transfer control device 110 in S16 of FIG. 5. If there is an input of the operation direction (Yes in SS11), the process ends the sub program and returns to the main program. If there is no input of the operation direction (No in SS11), the transfer control device 110 proceeds to SS12 and determines whether a stop direction is input, that is, whether the controller 60 outputs the operation stop to the transfer control device 110 in S40 of FIG. 5. If there is an input of the stop direction (Yes in SS12), the operation of the optical disc exchanging device 30 stops and thereby the BCA recording and reproducing apparatus 1 stops. If there is no input of the stop direction (No in SS12), the process returns to SS11. In this way, the operation confirmation processing waits for an input of the operation direction when there is no input of the stop direction.

After executing the operation confirmation processing in SS1, the transfer control device 110 proceeds to S86 and determines whether an abnormality response direction is input. This is determined whether the controller 60 outputs the abnormality response direction to the transfer control device 110 in S62 of FIG. 5. If there is no input of the abnormality response direction (No in S86), the process proceeds to SA1.

Figure 14:
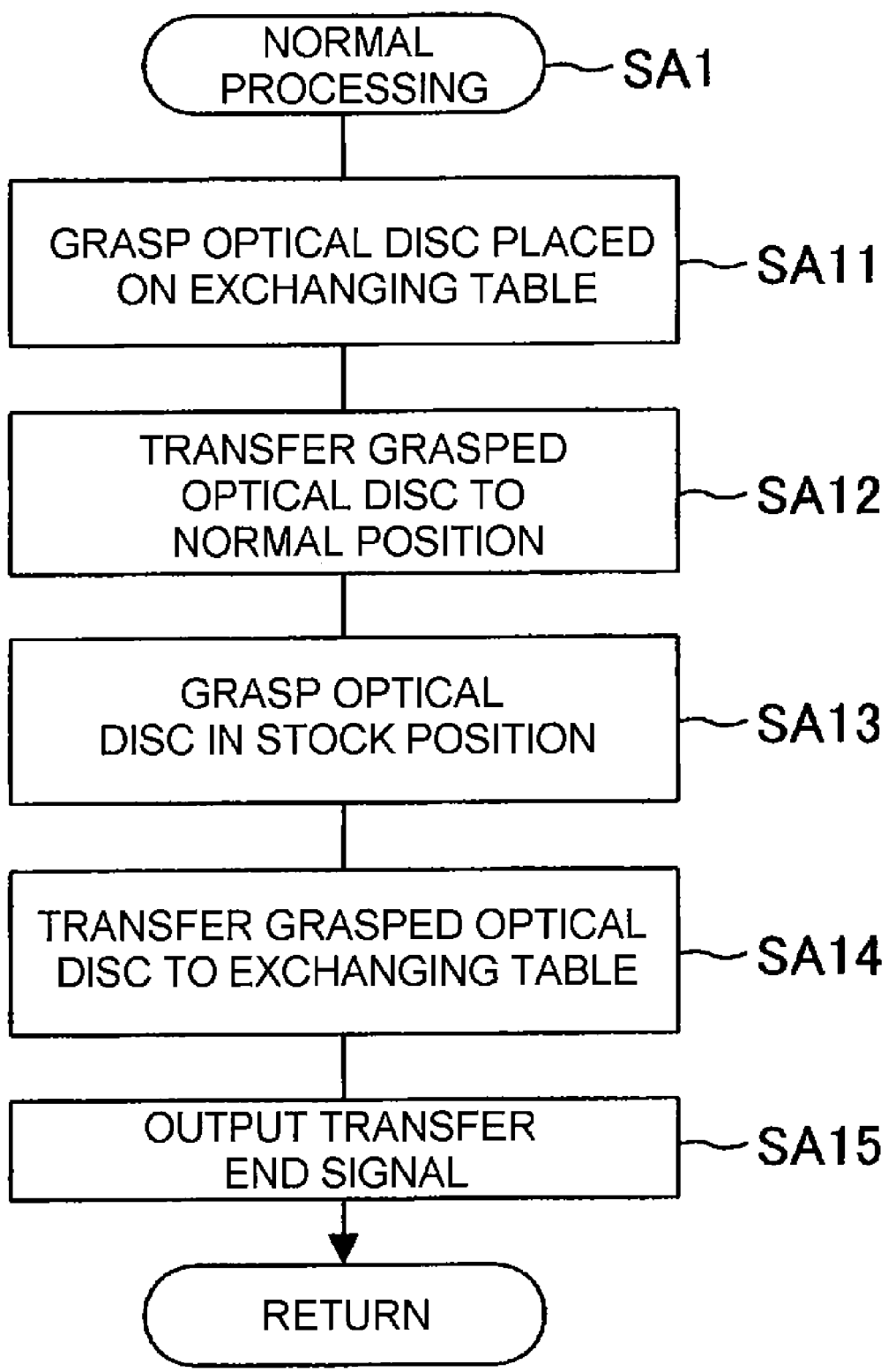
FIG. 14 is a flowchart showing a sub program for performing normal processing.

In SA1, the transfer control device 110 performs normal processing. The normal processing is performed by executing the sub program shown in FIG. 14. By the execution of the sub program, the grasping portion 31 of the optical disc exchanging device 30 grasps the optical disc which is placed on the exchanging table 13 (SA11) and transfers the grasped optical disc to the normal position (first position) (SA12). The optical disc which has been placed on the exchanging table 13 is thereby stored in the normal position. Then, the grasping portion 31 grasps an optical disc which is stored in the stock position (SA13) and moves the grasped optical disc to the exchanging table 13 (SA14). The new optical disc is thereby placed on the exchanging table 13. Then, the transfer control device 110 outputs a transfer end signal to the controller 60 (SA15). After that, the process ends the sub program and returns to the main program. After the transfer control device 110 performs the normal processing in SA1, it returns to SS1. The case where the normal processing is performed is when there is no input of the abnormality response direction in S86 and, in this case, the verification determination in S60 of FIG. 5 determines that BCA data is properly recorded on an optical disc. Accordingly, the execution of the normal processing is repeated and thereby the optical discs on which BCA data is properly recorded are stored in the normal position one after another. Because the recording of BCA data onto an optical disc is highly reliable, it is a rare case that the abnormality response direction is output. Therefore, the transfer control device 110 usually executes the processing of SS1, S86 and SA1 repeatedly.

Figure 15:
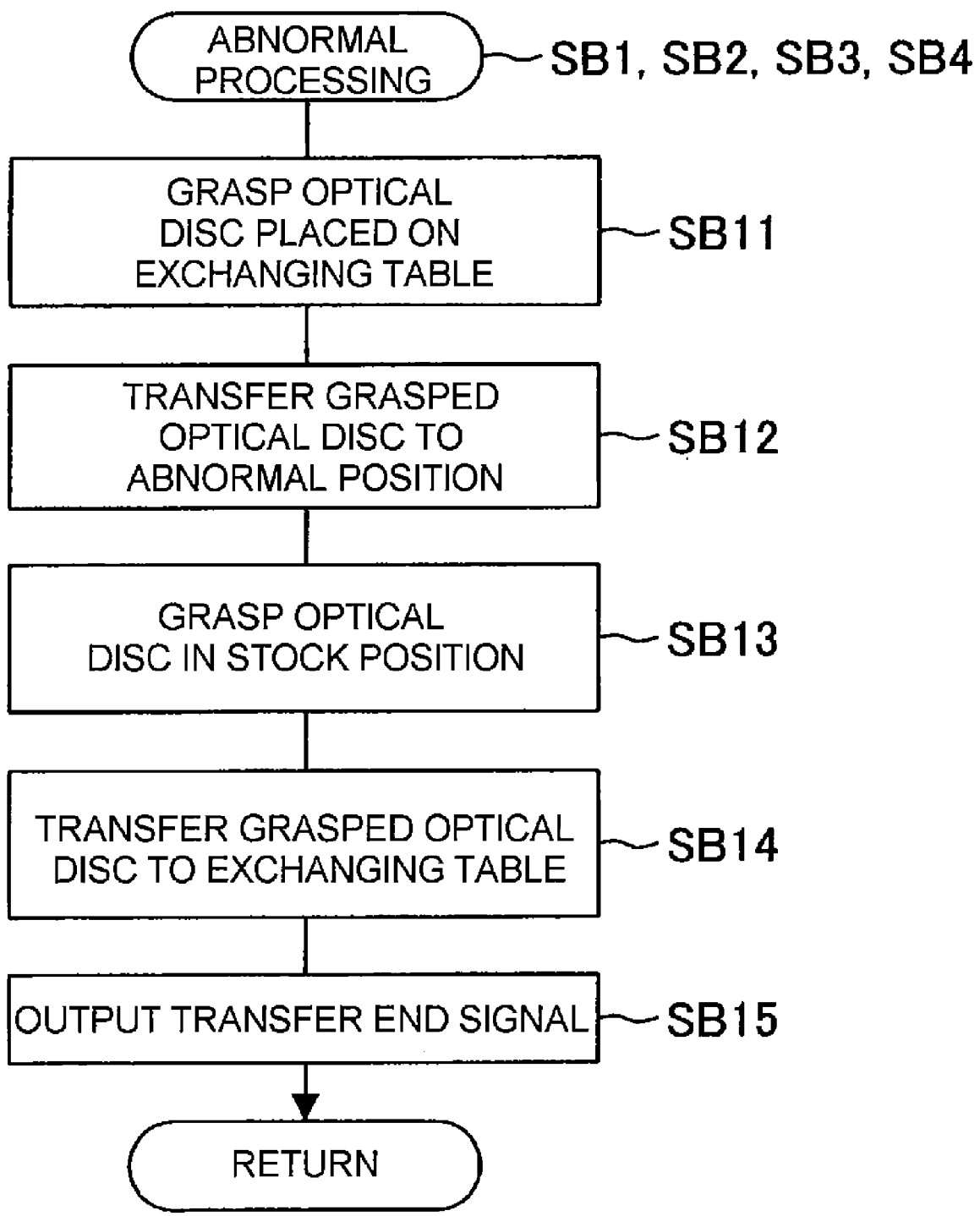
FIG. 15 is a flowchart showing a sub program for performing abnormal processing.

If the transfer control device 110 determines in S86 that the abnormality response direction is input, it proceeds to SB1. In SB1, the transfer control device 110 performs abnormal processing. The abnormal processing is performed by executing the sub program shown in FIG. 15. By the execution of the sub program, the grasping portion 31 of the optical disc exchanging device 30 grasps the optical disc which is placed on the exchanging table 13 (SB11) and transfers the grasped optical disc to the abnormal position (second position) (SB12). The optical disc which has been placed on the exchanging table 13 is thereby stored in the abnormal position. Then, the grasping portion 31 grasps an optical disc which is stored in the stock position (SB13) and moves the grasped optical disc to the exchanging table 13 (SB14). The new optical disc is thereby placed on the exchanging table 13. After that, the transfer control device 110 outputs a transfer end signal to the controller 60 (SB15). The abnormal processing thereby ends and the process returns to the main program. The case where the abnormal processing is performed is when there is an input of the abnormality response direction in S86 and, in this case, the verification determination in S60 of FIG. 5 determines that BCA data is not properly recorded on an optical disc. Accordingly, by the abnormal processing, the optical disc on which BCA data is not properly recorded is stored in the abnormal position.

Figure 16:
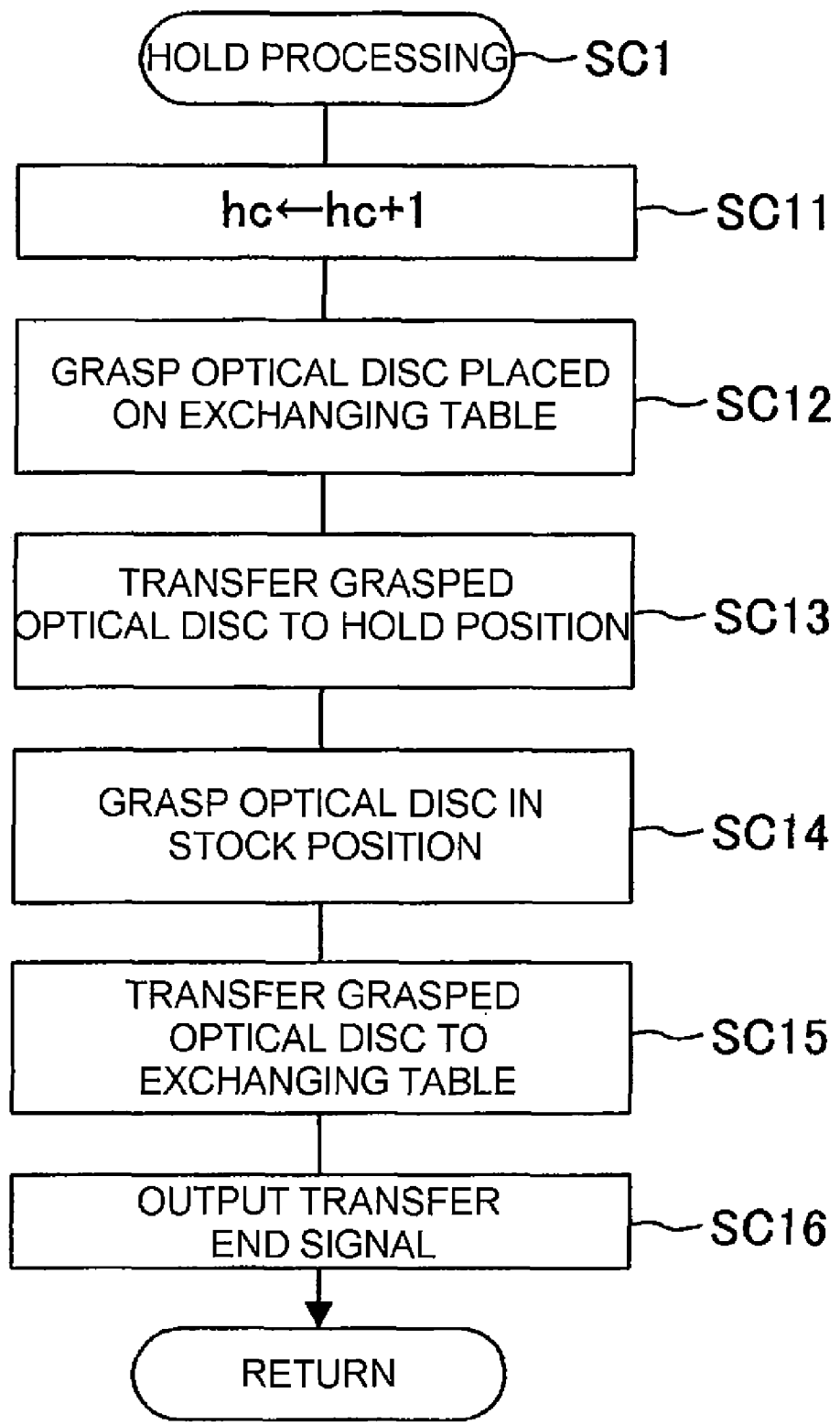
FIG. 16 is a flowchart showing a sub program for performing hold processing.

If the abnormal processing is performed in SB 1, the transfer control device 110 proceeds to SS2 and performs the operation confirmation processing. The operation confirmation processing is the same as the operation confirmation processing in SS1. After the operation confirmation, the transfer control device 110 proceeds to S88 and determines whether the abnormality response direction is input. If the abnormality response direction is input (Yes in S88), the transfer control device 110 proceeds to SB2, performs the abnormal processing and then returns to SS1. If the abnormality response direction is not input (No in S88), the transfer control device 110 proceeds to SC1 and performs the hold processing. The hold processing is performed by executing the sub program shown in FIG. 16. In the execution of the hold processing, the transfer control device 110 first increments the hold counter hc in SC11 of FIG. 16. Because the hold counter hc is initially set to 0 in S84 of the main program of FIG. 12, hc is set to 1 when the processing of SC11 is executed for the first time. Then, the transfer control device 110 controls the optical disc exchanging device 30 in such a way that the grasping portion 31 grasps the optical disc which is placed on the exchanging table 13 (SC 12) and transfers the grasped optical disc to the hold position (third position) (SC13). The optical disc which has been placed on the exchanging table 13 is thereby stored in the hold position. Then, the transfer control device 110 controls the optical disc exchanging device 30 in such a way that the grasping portion 31 grasps an optical disc which is stored in the stock position (SC14) and transfers the grasped optical disc to the exchanging table 13 (SC15). The new optical disc is thereby placed on the exchanging table 13. After that, the transfer control device 110 outputs a transfer end signal to the controller 60 (SC16). The hold processing thereby ends and the process returns to the main program. The case where the hold processing is performed is when there is no input of the abnormality response direction for the optical disc on which the abnormal processing has been performed in SB1 (No in S88), that is, when the first normal optical disc is processed after the abnormal processing. Such an optical disc is stored in the hold position.

Figure 17:
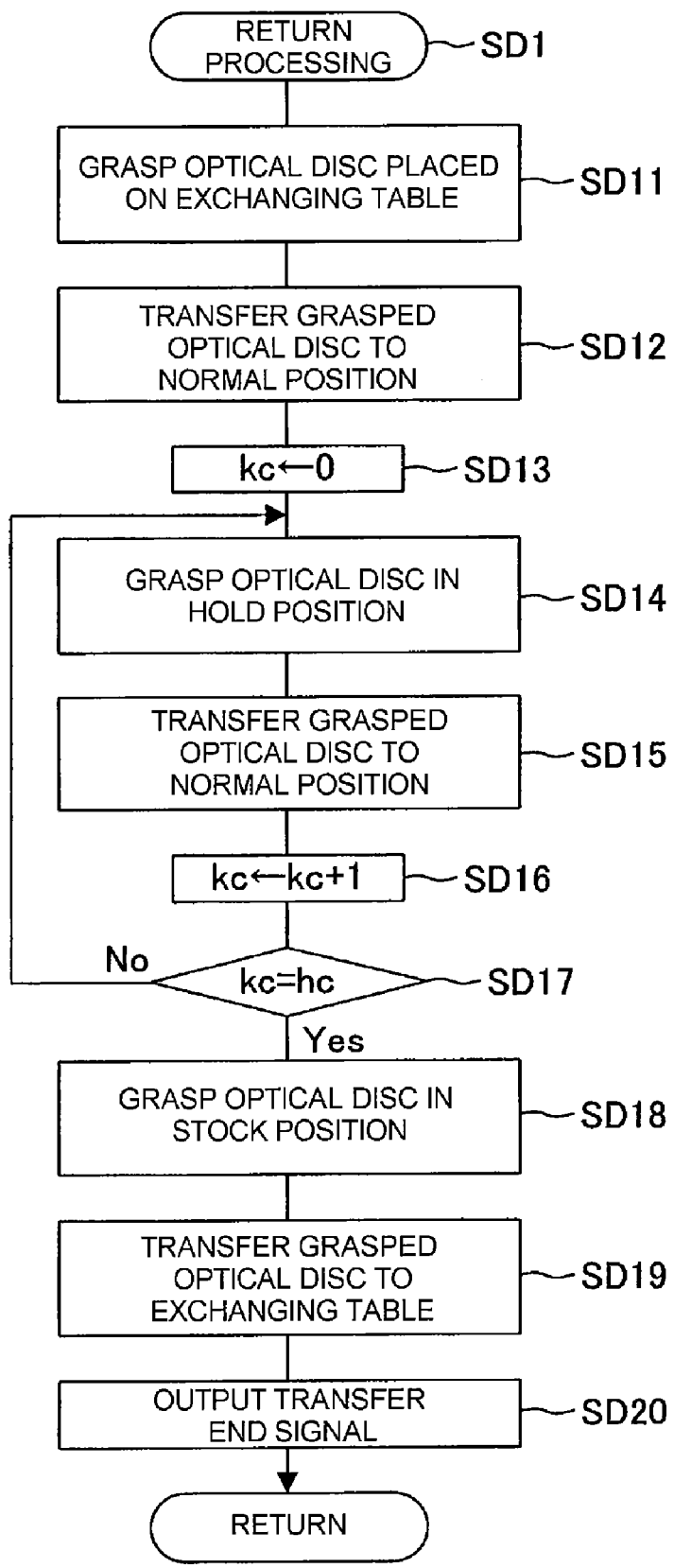
FIG. 17 is a flowchart showing a sub program for performing return processing.

After performing the hold processing in SC1, the transfer control device 110 proceeds to SS3 and performs the operation confirmation processing. The operation confirmation processing in SS3 is also the same as the processing in SS1. Then, in S90, it is determined whether there is an input of the abnormality response direction. If there is no input of the abnormality response direction (No in S90), the transfer control device 110 proceeds to SD1 and performs return processing. The return processing is performed by executing the sub program shown in FIG. 17. In the execution of the return processing, the transfer control device 110 controls the optical disc exchanging device 30 in such a way that the grasping portion 31 grasps the optical disc which is placed on the exchanging table 13 (SD11) and transfers the grasped optical disc to the normal position (SD 12). Then, the transfer control device 110 sets the exchange counter kc to 0 in SD13. After that, the transfer control device 110 controls the optical disc exchanging device 30 in such a way that the grasping portion 31 grasps the optical disc which is stored in the hold position (SD 14) and transfers the grasped optical disc to the normal position (SD15). Then, the transfer control device 110 increments the exchange counter kc in SD16 and further determines whether the exchange counter kc is the same as a hold counter hc in SD17. The hold counter hc indicates the number of optical discs which are stored in the hold position, and the exchange counter kc indicates the number of times the optical disc exchanging device 30 transfers an optical disc from the hold position to the normal position. Thus, the determination in SD17 indicates whether all of the optical discs in the hold position are transferred to the normal position.

If the determination result of SD17 is No, it means that an optical disc which is not yet transferred to the normal position exists in the hold position. In this case, the transfer control device 110 returns to SD14 and executes the processing of SD14 and SD15, thereby transferring the optical disc in the hold position to the normal position. On the other hand, if the determination result of SD17 is Yes, it means that all of the optical discs in the hold position are transferred to the normal position. In this case, the transfer control device 110 proceeds to SD18 and grasps the optical disc in the stock position and then transfers the grasped optical disc to the exchanging table 13 in SD19. After that, the transfer control device 110 outputs a transfer end signal to the controller 60 in SD20. The return processing thereby ends and the process returns to the main program. After performing the return processing in SD 1, the transfer control device 110 proceeds to S92 and sets the hold counter hc back to 0. The process then returns to SS1.

In the above return processing, after the optical disc which is placed on the exchanging table 13 is transferred to the normal position by the processing of SD 11 and SD12, the optical disc which is stored in the hold position is then transferred to the normal position by the processing of SD14 and SD15. In this case, if the optical disc which is stored in the hold position is the n-th optical disc, the (n+1)th optical disc, which is the optical disc placed on the exchanging table 13, is transferred to the normal position in advance, and then the n-th optical disc which is stored in the hold position is transferred to the normal position after that. Thus, by the return processing, the optical disc which is processed (recording processing, reproduction processing and exchange processing) subsequently is stored into the normal position ahead of the optical disc which has been processed precedently and stored in the hold position. Therefore, the storage sequence of the optical discs in the normal position is in the order of: the (n+1)th optical disc, the n-th optical disc, the (n+2)th optical disc and on, in which the n-th and the (n+1)th optical discs are reversed in order. However, when the return processing (SD1) is performed, the hold processing (CS1) has been performed previously, and when the hold processing (CS1) is performed, the abnormal processing (SB1) has been performed previously. In the case where the abnormal processing is performed in SB1, the abnormality response direction has been output from the controller 60 in S62 of FIG. 5, and the data reorganization processing has been performed in S64. In the data reorganization processing, the sequence of BCA data has been changed to the order of: $BCA_n$, $BCA_{n-1}$, $BCA_{n+1}$, $BCA_{n+2}$, . . . . Thus, the data $BCA_n$ is recorded on the n-th optical disc, and the data $BCA_{n-1}$ is recorded on the (n+1)th optical disc. Accordingly, if the order of optical discs is changed between the (n+1)th optical disc and the n-th optical disc, the data sequence becomes the right order of: $BCA_{n-1}$, $BCA_n$, $BCA_{n+1}$, $BCA_{n+2}$, . . . . Therefore, the execution of the hold processing and the return processing accompanying the data reorganization processing allows the sequential order of optical discs and the numerical order of BCA data to correspond to each other.

Further, in the main program of FIG. 12, if the determination result about the presence or absence of the abnormality response direction in S88 is Yes, that is when the abnormality response direction is input in S86 and the abnormality response direction is input also in S88 or when the abnormality response direction is input in succession, the process performs the abnormal processing in SB2 and then returns to SS1. In this case, the hold processing and the return processing are not performed. In the case where the abnormality response direction is input twice in succession, the data reorganization processing in S64 of FIG. 5 has been also performed twice in succession. In this case, by the first data reorganization processing, the data sequence is changed to the order of: $BCA_n$, $BCA_{n-1}$, $BCA_{n+1}$, $BCA_{n+2}$, . . . . Then, by the second data reorganization processing, the data $BCA_n$ is inserted between the data $BCA_{n-1}$ and the data $BCA_{n+1}$, and the data subsequent to the data $BCA_{n+1}$ is thereby brought down one by one, so that the data sequence is changed to the order of: $BCA_{n-1}$, $BCA_n$, $BCA_{n+1}$, $BCA_{n+2}$, . . . . This sequence is the same as the original sequence. Thus, if the abnormality response direction is input twice in succession, the data reorganization processing is performed twice in succession and, consequently, the data sequence returns to the original in this case. This is not limited to the case where the abnormality response direction is input twice in succession, and this is the same for the case where the abnormality response direction is input an even number of times in succession. This eliminates the need for performing the hold processing and the return processing of optical discs. Therefore, if the abnormality response direction is input in S88, the process returns to SS1 after performing the abnormal processing (SB2), and the optical disc whose verification result in S60 of FIG. 5 is suitable is transferred to the normal position by the normal processing in SA1.

If the determination result about the abnormality response direction in S90 is Yes, the process proceeds to SB3 and performs the abnormal processing in SB3. After that, the process performs the operation confirmation processing in SS4 and determines whether there is an input of the abnormality response direction in S94. If there is an input of the abnormality response direction (Yes in S94), the process proceeds to SB4 to perform the abnormal processing and then returns to SS3. If there is no input of the abnormality response direction (No in S94), the process returns to SC1.

The case where the determination result in S90 is Yes and the determination result in S94 is also Yes is when the abnormality response direction is input twice in succession. In this case, the sequence of BCA data returns to its original as described above. Therefore, after performing the abnormal processing in SB4, the process returns to SS3, which is the state before the determination in S90.

Figure 19:
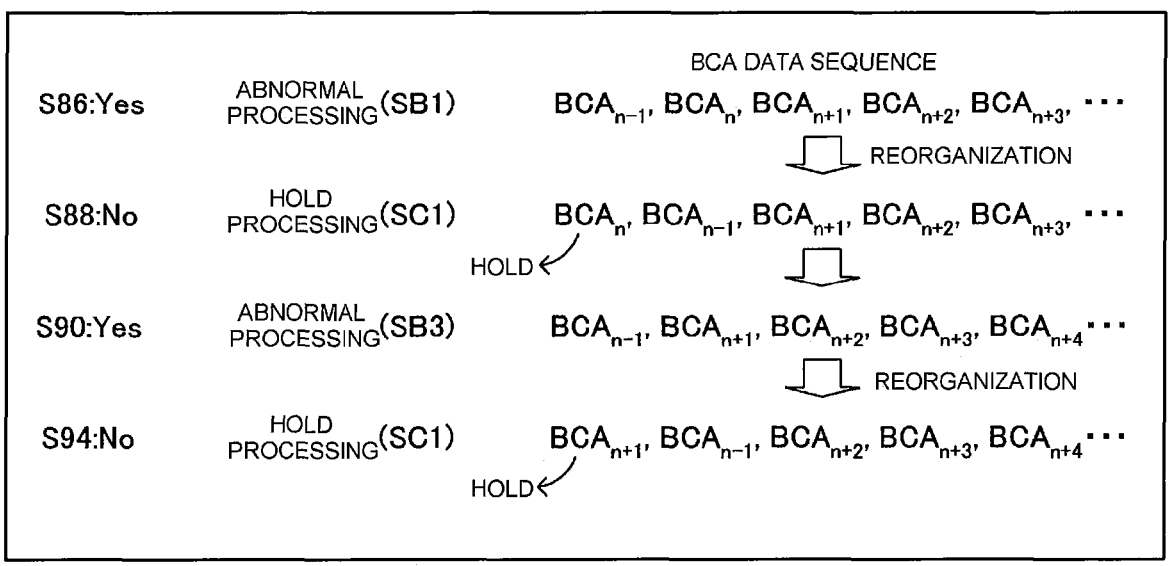
FIG. 19 is a view showing a BCA data sequence when abnormal processing and hold processing are performed alternately.
Figure 20:
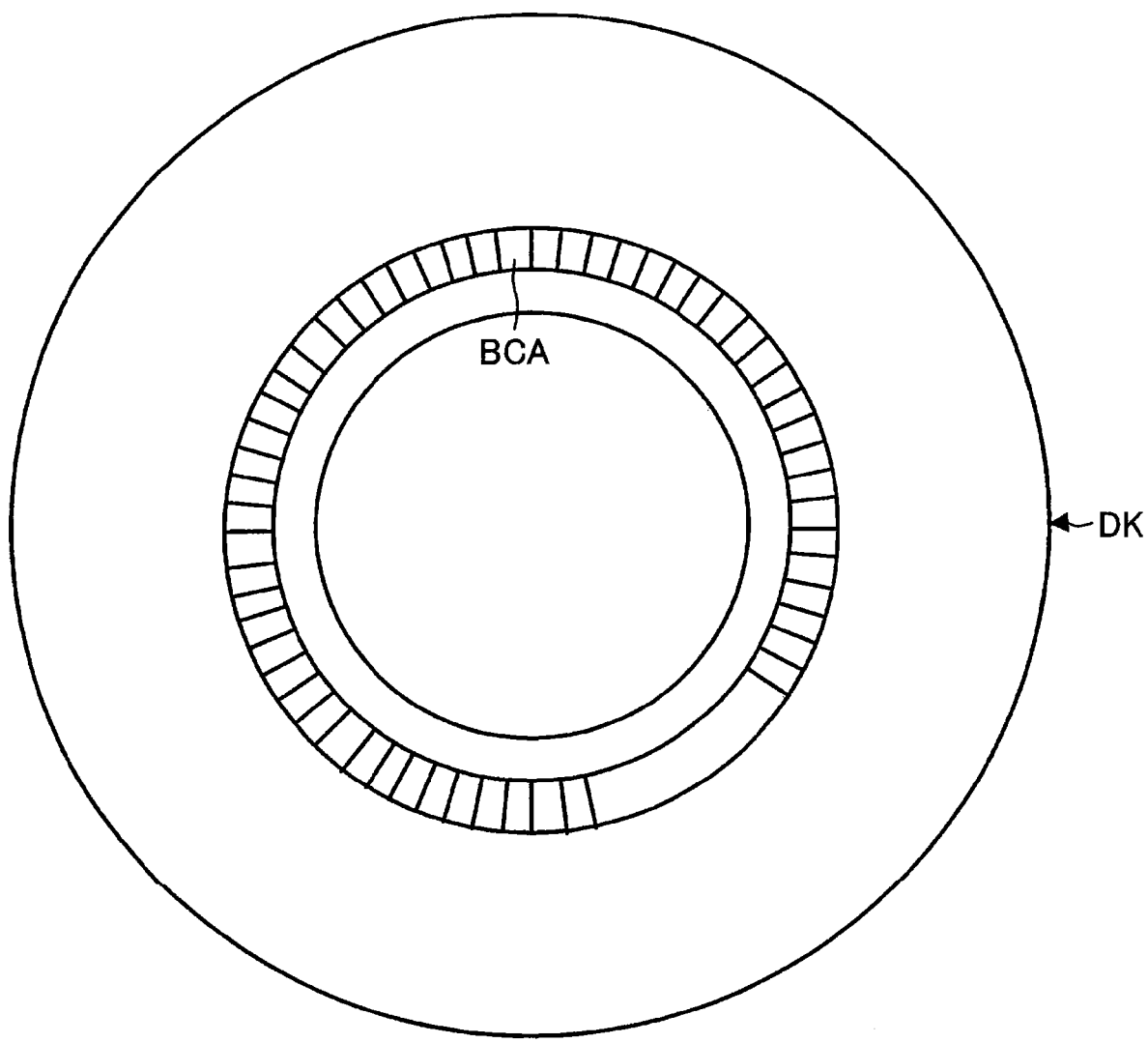
FIG. 20 is a view showing an optical disc on which BCA data is recorded.

If the determination result in S86 is Yes, the process proceeds to SB1 and performs the abnormal processing. If the subsequent determination result in S88 is No, the process proceeds to SC1 and performs the hold processing. Further, if the determination result in S90 is also Yes, the process proceeds to SB3 and performs the abnormal processing. Furthermore, if the determination result in S94 is No, the process returns to SC1 and performs the hold processing. In this way, if the abnormality response direction is input alternately, the hold processing is performed in succession with the abnormal processing performed therebetween. In such a case, the order of the same BCA data ($BCA_{n-1}$ in FIG. 19) is brought down each time the BCA data is reorganized as shown in FIG. 19. Thus, in this case, the transfer control device 110 controls the optical disc exchanging device 30 so as to transfer all of the optical discs on which the BCA data that has come ahead of the BCA data that has been brought down by data reorganization is recorded (which are the optical discs on which $BCA_n$ and $BCA_{n-1}$ are recorded in the example of FIG. 19) to the hold position. Further, by the subsequent return processing, the transfer control device 110 controls the optical disc exchanging device 30 so as to transfer the optical disc on which the BCA data that has been brought down ($BCA_{n-1}$ in FIG. 19) is recorded to the normal position ahead of all the optical discs which are stored in the hold position, and then transfer the optical discs stored in the hold position to the normal position. The transfer control device 110 controls the optical disc exchanging device 30 in such a way that, when the optical disc exchanging device 30 transfers a plurality of optical discs which are stored in the hold position to the normal position, it grasps and transfers the optical disc which has stored precedently to the normal position. The continuity of BCA data is thereby maintained.

As described in the foregoing, according to the BCA recording and reproducing apparatus 1 according to this embodiment and the BCA recording and reproducing method onto an optical disc which is executed by the recording and reproducing apparatus 1, recording of data onto an optical disc, reproduction of data recorded on an optical disc, and ejection (exchange) of an optical disc are performed in parallel. It is thereby possible to provide the optical disc recording and reproducing apparatus and the optical disc recording and reproducing method which improve the production efficiency by performing data recording and reproduction within substantially the same time as performing data recording only and minimizing a time loss due to optical disc exchange. Further, the BCA recording and reproducing apparatus 1 according to this embodiment verifies the BCA data which is recorded on an optical disc and, if the verification result is fault, it inserts the BCA data that is used in the verification into the position at the top of the BCA data which are stored in the memory 60a. Then, the BCA recording and reproducing apparatus 1 records that BCA data onto an optical disc again in the next processing. The BCA data in itself is thus not discarded, which eliminates a trouble in product management.

Figure 18:
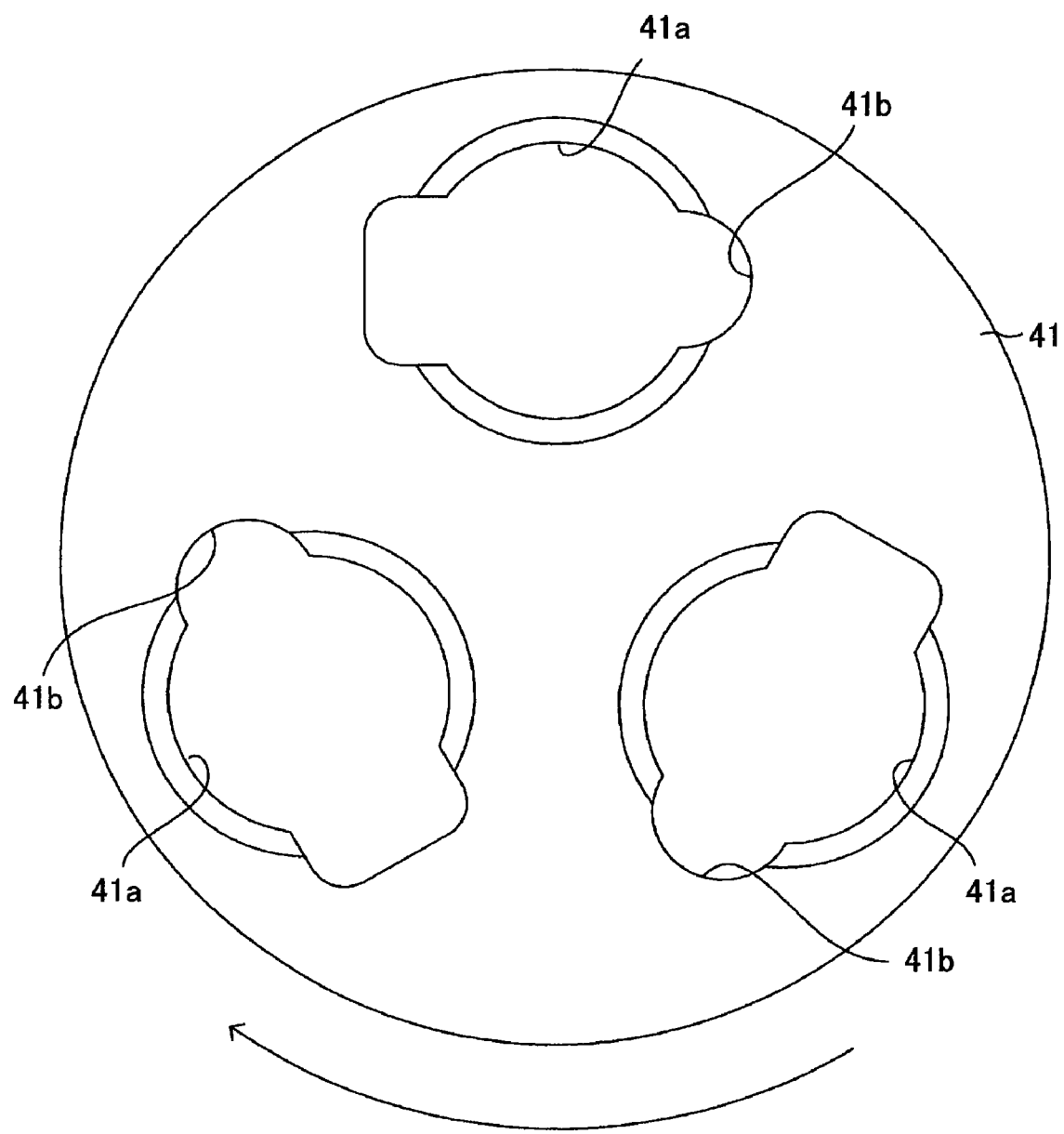
FIG. 18 is a schematic view showing another example of an optical disc moving table.

As a result of conducting a movement test of an optical disc using the present apparatus, the inventor has found that it is preferred that the structure of the hole 41a of the optical disc moving table 41 has an opening 41b that is not blocked by an optical disc at least on the side of the rotating direction as shown in FIG. 18. If the hole 41a has such a shape, even if the optical disc moving table 41 rotates at high speed, it is possible to prevent the optical disc placed in the hole 41a from going up or being deviated due to air current.

It should be understood by those skilled in the art that various modifications, combinations, sub-combinations and alterations may occur depending on design requirements and other factors insofar as they are within the scope of the appended claims or the equivalents thereof.

For example, in the above-described embodiment, an optical disc is placed on each table by rotating the optical disc moving table 41 and moving up/down the fixing portion 51. However, the optical disc moving table 41 may both rotate and move up/down. Further, in the above-described embodiment, the reproducing optical head 26, the reproducing optical head control circuit 105 and the verifying circuit 106 reproduce BCA data and verify the reproduced BCA data against recording BCA data to determine pass or fail. Then, if it fails (when the reproduced data and the recording data do not match), the reorganization of the BCA data and the rearrangement of the optical discs on which BCA data is recorded are performed so that the sequence of the optical discs and the sequence of the BCA data correspond to each other. However, if the frequency to determine failure in the verification determination is extremely low and a slight change in the order of the BCA data does not cause any practical problem, the data reorganization and rearrangement may be omitted. In this case, the BCA recording and reproducing apparatus performs BCA data recording, reproduction and verification only, and then a failed optical disc is eliminated by hand, and the BCA data of the failed optical disc is input again by an input device and recorded onto a different optical disc. This enables further reduction of apparatus costs. Furthermore, although the case where the present application is applied to the BCA recording and reproducing apparatus is described in the above embodiment, the present application may be applied to any apparatus as long as it is an apparatus which records prescribed data onto a disc and reproduces recorded data, not only to the case where data is BCA data.

Although the above embodiment describes the case where the ejection of the optical disc which is placed on the exchanging table 13 and the placement of a new optical disc on the exchanging table 13 are performed by the same optical disc exchanging device 30, they may be performed by different mechanism parts. Further, in the above-described embodiment, the ejection of an optical disc and the insertion of a new optical disc are performed using the same exchanging table 13. Although this system most contributes to reduction of space and cost, a table to eject an optical disc and a table to insert a new optical disc may be separated in the application. Furthermore, in the above-described embodiment, the movement of an optical disc among tables is implemented by the rotation of the optical disc moving table 41. However, if a table for optical disc ejection and a table for new optical disc insertion are different, the movement of an optical disc may linear, for example. In addition, although the above embodiment describes the case where the optical disc moving table 41 has three holes 41a, it may have four or more holes 41a if processing other than recording, reproduction and exchange is performed. In such a case, all of the processing may be executed in parallel on the tables corresponding to the number of holes, for example.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical disc recording and reproducing apparatus comprising:
   a first table, a second table and a third table, each of the tables configured to receive an optical disc;
   an optical disc recording unit including a first rotating unit to rotate the first table and a recording optical head to record data on the optical disc by irradiating a laser beam onto the optical disc placed on the first table;
   an optical disc reproducing unit including a second rotating unit to rotate the second table and a reproducing optical head to reproduce data recorded by the optical disc recording unit by irradiating a laser beam onto the optical disc placed on the second table;
   an optical disc exchanging unit including an ejecting mechanism to eject the optical disc placed on the third table from the third table;
   an optical disc moving unit to move the optical disc placed on the first table to the second table and move the optical disc placed on the second table to the third table, the optical disc moving unit including
      an optical disc moving table having at least three holes where at least three optical discs can be placed with the prescribed distance apart;
      a moving table moving unit to move the optical disc moving table above the first table, the second table and the third table;
      a working table moving unit to move the first table, the second table and the third table relatively to the hole in an axial direction of the optical disc to be placed in the hole; and
      a movement control unit to control movement of the optical disc moving table by the moving table moving unit in such a way that the holes of the optical disc moving table are respectively located above the first table, the second table and the third table sequentially, and control the working table moving unit so as to perform a first operation that projects the first table, the second table and the third table from the holes of the optical disc moving table when the holes are located above the first table, the second table and the third table, and second operation that buries the first table, the second table and the third table projected from the holes by the first operation into the holes; and
   an operation control unit to control operation of the optical disc recording unit, the optical disc reproducing unit and the optical disc exchanging unit so as to perform recording of data onto the optical disc placed on the first table by the optical disc recording unit, reproduction of data recorded on the optical disc placed on the second table by the optical disc reproducing unit, and ejection of the optical disc placed on the third table by the optical disc exchanging unit in parallel,
   wherein the tables are arranged in such a way that the first table is adjacent to the second table at a prescribed distance apart, and the second table is adjacent to the third table at the same prescribed distance apart.

2. The optical disc recording and reproducing apparatus according to claim 1, wherein
   the third table is adjacent to the first table at the same prescribed distance apart, the optical disc moving table has the three holes, the moving table moving unit rotates the optical disc moving table, and the movement control unit controls rotation of the optical disc moving table by the moving table moving unit in such a way that the three holes of the optical disc moving table are respectively located above the first table, the second table and the third table sequentially.

3. The optical disc recording and reproducing apparatus according to claim 2, wherein the optical disc exchanging unit includes an input mechanism to place the optical disc on the third table, and the optical disc moving unit moves the optical disc placed on the third table by the input mechanism to the first table.

4. The optical disc recording and reproducing apparatus according to claim 1, wherein the operation control unit includes:

a storage unit to store a plurality of pieces of data in a prescribed order so as to record different data onto the different optical discs by the optical disc recording unit;

a data output unit to output the data stored in the storage unit to the optical disc recording unit in accordance with the prescribed order; and a verifying unit to compare recording data output from the data output unit with data recorded on the optical disc based on the recording data by the optical disc recording unit and reproduced by the optical disc reproducing unit and determine whether data recording onto the optical disc is properly performed.

5. The optical disc recording and reproducing apparatus according to claim 4, wherein the operation control unit includes:

a data sequence reorganizing unit to reorganize a data sequence in such a way that an order of the data stored in the storage unit is brought down by one when the verifying unit determines that data recording is not properly performed, and the recording data used when the verifying unit determines that data recording is not properly performed is set as data to be output next from the data output unit.

6. The optical disc recording and reproducing apparatus according to claim 5, further comprising:

a transfer control unit to control the optical disc exchanging unit in such a way that the optical disc exchanging unit performs normal operation to transfer the optical disc determined that data recording is properly performed by the verifying unit from the third table to a first position, abnormal operation to transfer the optical disc determined that data recording is not properly performed by the verifying unit from the third table to a second position, hold operation to transfer the first optical disc determined that data recording is not properly performed and then determined that data recording is properly performed by the verifying unit from the third table to a third position, and return operation to transfer the optical disc transferred to the third position to the first position after the first normal operation performed after the hold operation.

7. The optical disc recording and reproducing apparatus according to claim 6, wherein, if the optical disc exchanging unit performs the abnormal operation an even number of times in succession, the transfer control unit controls the optical disc exchanging unit so as to perform the normal operation without performing the hold operation on the first optical disc determined that data recording is properly performed by the verifying unit.

8. The optical disc recording and reproducing apparatus according to claim 1, wherein the data recorded by the optical disc recording unit and the data reproduced by the optical disc reproducing unit are identification data of the optical disc.

9. The optical disc recording and reproducing apparatus according to claim 1, wherein the working table moving unit includes:

a fixing portion to fix the first table, the second table, the third table, the first rotating unit and the second rotating unit; and an up/down unit to move up/down the fixing portion so as to perform the first operation and the second operation.

10. The optical disc recording and reproducing apparatus according to claim 1, wherein the holes of the optical disc moving table has a portion not blocked by the optical disc when the optical disc is placed, on al front side of a moving direction of the optical disc moving table.

11. An optical disc recording and reproducing method comprising the steps of:

performing a processing process executing a recording process to record data on an optical disc by irradiating a laser beam onto the optical disc placed on a first table a reproducing process to reproduce data recorded by the recording process by irradiating a laser beam onto the optical disc placed on a second table, and an optical disc exchanging process including an ejecting process to eject the optical disc placed on a third table from the third table in parallel; and performing an optical disc moving process including a first moving process to move the optical disc placed on the first table to the second table and a second moving process to move the optical disc placed on the second table to the third table, after the processing process ends, the optical disc moving process further including moving an optical disc moving table above the first table, the second table and the third table, the optical disc moving table having at least three holes configured to receive at least three optical discs and placed with the prescribed distance apart, moving the first table, the second table and the third table relatively to the hole in an axial direction of the optical disc to be placed in the hole, controlling movement of the optical disc moving table by the moving table moving unit in such a way that the holes of the optical disc moving table are respectively located above the first table, the second table and the third table sequentially, and controlling the working table moving unit so as to perform a first operation that projects the first table, the second table and the third table from the holes of the optical disc moving table when the holes are located above the first table, the second table and the third table, and second operation that buries the first table, the second table and the third table projected from the holes by the first operation into the holes, and wherein the tables are arranged in such a way that the first table is adjacent to the second table at a prescribed distance apart, and the second table is adjacent to the third table at the same prescribed distance apart.

12. The optical disc recording and reproducing method according to claim 11, wherein
the optical disc exchanging process further includes an inserting process to insert a different optical disc onto the third table after ejecting the optical disc from the third table, and
the optical disc moving process further includes a third moving process to move the different optical disc placed on the third table to the first table.

13. The optical disc recording and reproducing method according to claim 11, wherein
the reproducing process includes a verifying process to verify data reproduced in the reproducing process against data used when recording the data in the recording process and determine whether data is properly recorded on the optical disc, and
the optical disc exchanging process transfers the optical disc determined that data is properly recorded by the verifying process from the third table to a first position and transfers the optical disc determined that data is not properly recorded by the verifying process from the third table to a second position.

14. The optical disc recording and reproducing method according to claim 13, wherein,
when the verifying process determines that data is not properly recorded, the recording process in a subsequent processing process to the processing process records the data previously recorded on the optical disc determined that the data is not properly recorded again.

15. An optical disc manufacturing method comprising the steps of:
performing a processing process executing a recording process to record data on an optical disc by irradiating a laser beam onto the optical disc placed on a first table, a reproducing process to reproduce data recorded by the recording process by irradiating a laser beam onto the optical disc placed on a second table, and an optical disc exchanging process including an ejecting process to eject the optical disc placed on a third table from the third table in parallel; and
performing an optical disc moving process including a first moving process to move the optical disc placed on the first table to the second table and a second moving process to move the optical disc placed on the second table to the third table, after the processing process ends,
the optical disc moving process further including
moving an optical disc moving table above the first table, the second table and the third table, the optical disc moving table having at least three holes configured to receive at least three optical discs and placed with the prescribed distance apart,
moving the first table, the second table and the third table relatively to the hole in an axial direction of the optical disc to be placed in the hole,
controlling movement of the optical disc moving table by the moving table moving unit in such a way that the holes of the optical disc moving table are respectively located above the first table, the second table and the third table sequentially, and
controlling the working table moving unit so as to perform a first operation that projects the first table, the second table and the third table from the holes of the optical disc moving table when the holes are located above the first table, the second table and the third table, and second operation that buries the first table, the second table and the third table projected from the holes by the first operation into the holes, and
wherein the tables are arranged in such a way that the first table is adjacent to the second table at a prescribed distance apart, and the second table is adjacent to the third table at the same prescribed distance apart.

16. The optical disc manufacturing method according to claim 15, wherein
the optical disc exchanging process further includes an inserting process to insert a different optical disc onto the third table after ejecting the optical disc from the third table, and
the optical disc moving process further includes a third moving process to move the different optical disc placed on the third table to the first table.

17. The optical disc manufacturing method according to claim 15, wherein
the reproducing process includes a verifying process to verify data reproduced in the reproducing process against data used when recording the data in the recording process and determine whether data is properly recorded on the optical disc, and
the optical disc exchanging process transfers the optical disc determined that data is properly recorded by the verifying process from the third table to a first position and transfers the optical disc determined that data is not properly recorded by the verifying process from the third table to a second position.

* * * * *